(12) United States Patent
Kanno

(10) Patent No.: US 9,196,419 B2
(45) Date of Patent: *Nov. 24, 2015

(54) WIRELESS ELECTRIC POWER TRANSMISSION APPARATUS

(71) Applicant: Panasonic Corporation, Osaka (JP)

(72) Inventor: Hiroshi Kanno, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 479 days.

This patent is subject to a terminal disclaimer.

(21) Appl. No.: 13/686,076

(22) Filed: Nov. 27, 2012

(65) Prior Publication Data

US 2013/0134795 A1    May 30, 2013

Related U.S. Application Data

(60) Provisional application No. 61/564,353, filed on Nov. 29, 2011.

(51) Int. Cl.
*H01F 27/00* (2006.01)
*H01F 38/14* (2006.01)
*H02J 17/00* (2006.01)
*B60L 11/18* (2006.01)
*H02J 5/00* (2006.01)
*H02J 7/02* (2006.01)

(52) U.S. Cl.
CPC .............. *H01F 38/14* (2013.01); *B60L 11/182* (2013.01); *H02J 5/005* (2013.01); *H02J 17/00* (2013.01); *B60L 2200/12* (2013.01); *H02J 7/025* (2013.01)

(58) Field of Classification Search
CPC ....................................... H02J 5/005
USPC ........................................................ 307/104
See application file for complete search history.

(56) References Cited

U.S. PATENT DOCUMENTS

| | | | | |
|---|---|---|---|---|
| 8,508,076 B2 * | 8/2013 | Kanno | ........................... | 307/104 |
| 8,698,350 B2 * | 4/2014 | Kanno | ............................. | 307/19 |
| 2008/0278264 A1 | 11/2008 | Karalis et al. | | |
| 2010/0219696 A1 | 9/2010 | Kojima | | |

(Continued)

FOREIGN PATENT DOCUMENTS

| | | |
|---|---|---|
| JP | 2011-041464 A | 2/2011 |
| WO | 2011/122003 A1 | 10/2011 |
| WO | 2011/138860 A1 | 11/2011 |

OTHER PUBLICATIONS

Co-pending U.S. Appl. No. 13/686,104, filed Nov. 27, 2012.
Co-pending U.S. Appl. No. 13/686,242, filed Nov. 27, 2012.
International Search Report for corresponding International Application No. PCT/JP2012/007618 mailed Feb. 19, 2013.

(Continued)

*Primary Examiner* — Stephen W Jackson
(74) *Attorney, Agent, or Firm* — Renner, Otto, Boisselle & Sklar, LLP

(57) ABSTRACT

A wireless electric power transmission apparatus as an embodiment of the present disclosure includes: two antennas 107, 109 having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; and an oscillator 103 which is connected to one of the two antennas that transmits RF power. If the coupling coefficient between the two antennas 107 and 109 is k, then fs and fp are set so as to satisfy the inequality $-1.1516 \times k^2 + 0.0363 \times k + 0.9983 \leq fs/fp < 1$.

13 Claims, 20 Drawing Sheets

(56) References Cited

U.S. PATENT DOCUMENTS

| | | |
|---|---|---|
| 2011/0037322 A1 | 2/2011 | Kanno |
| 2011/0241437 A1 | 10/2011 | Kanno |
| 2011/0266882 A1 | 11/2011 | Yamamoto et al. |

OTHER PUBLICATIONS

Form PCT/ISA/237 for corresponding International Application No. PCT/JP2012/007618 dated Feb. 19, 2013.

* cited by examiner

- - - fs/fp = 1.0

—— FUNCTION OF fs/fp = k

FIG. 17A  K = 0.1
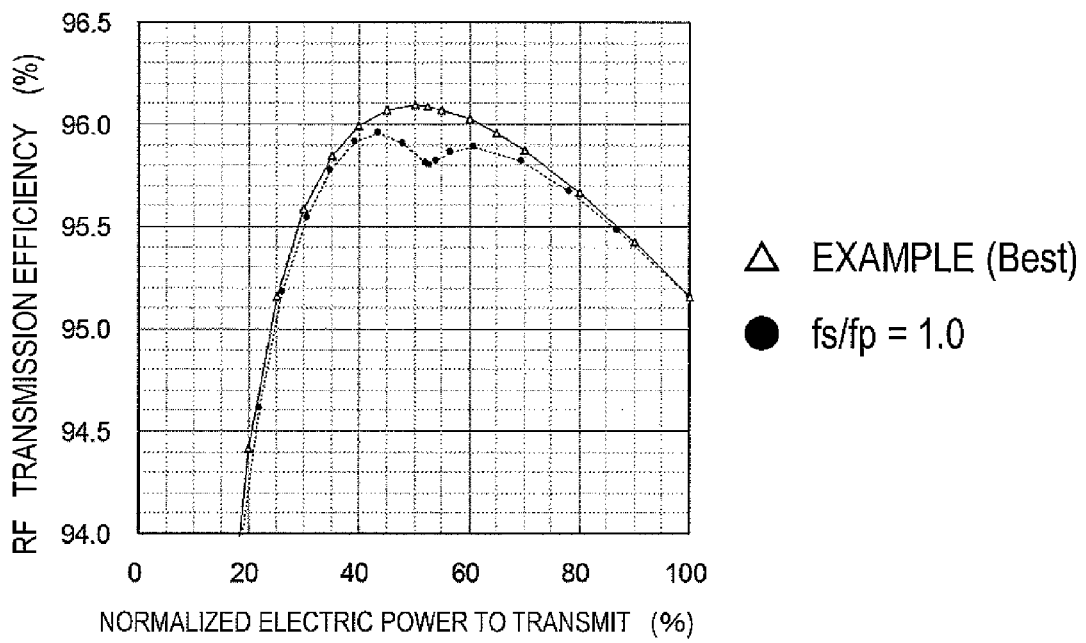
△ EXAMPLE (Best)
● fs/fp = 1.0
FIG. 17B  K = 0.1
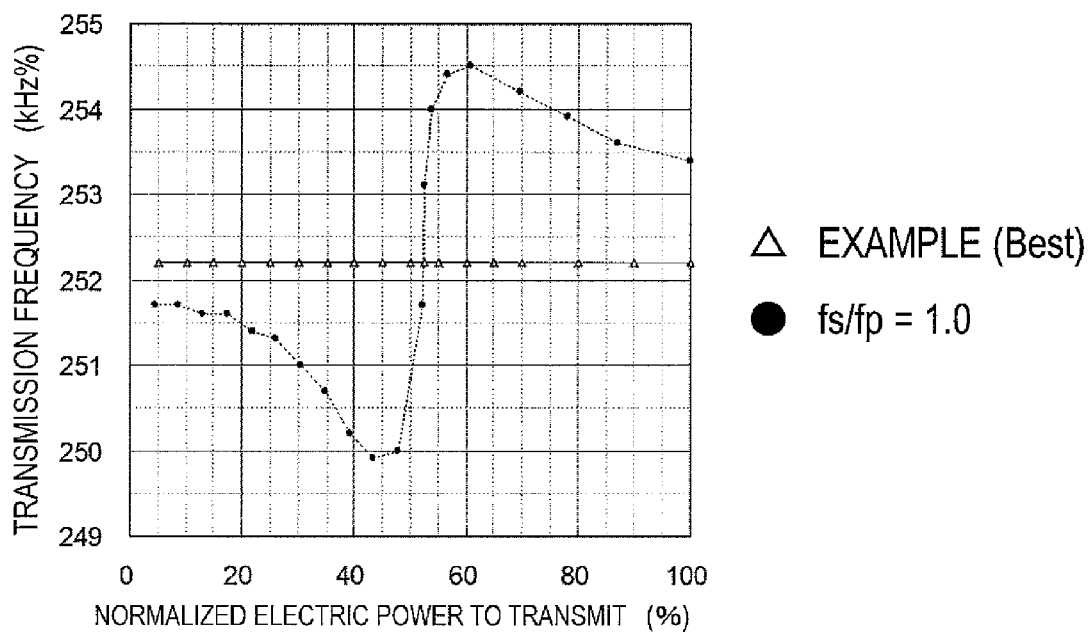
△ EXAMPLE (Best)
● fs/fp = 1.0

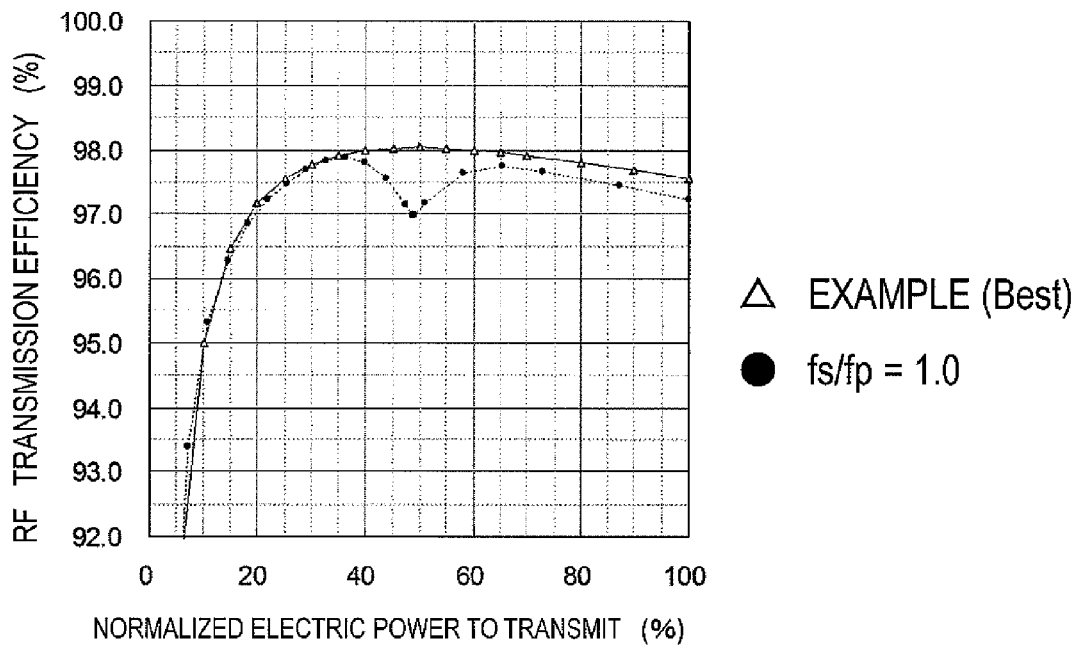
FIG.18A   K = 0.2
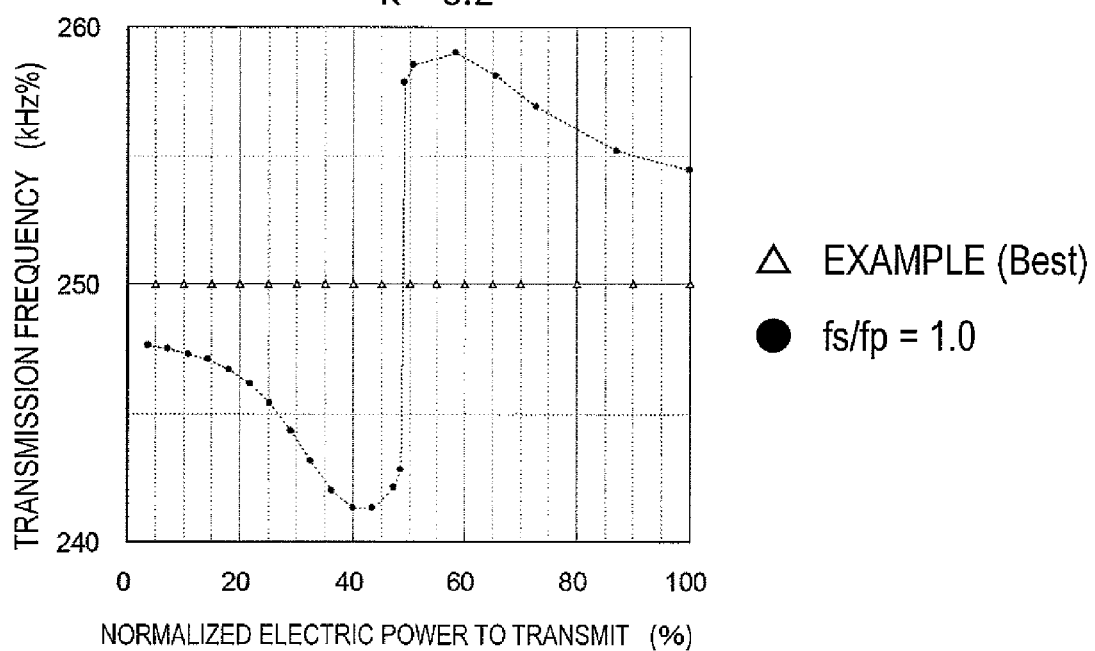
FIG.18B   K = 0.2

*FIG.19A* K = 0.3
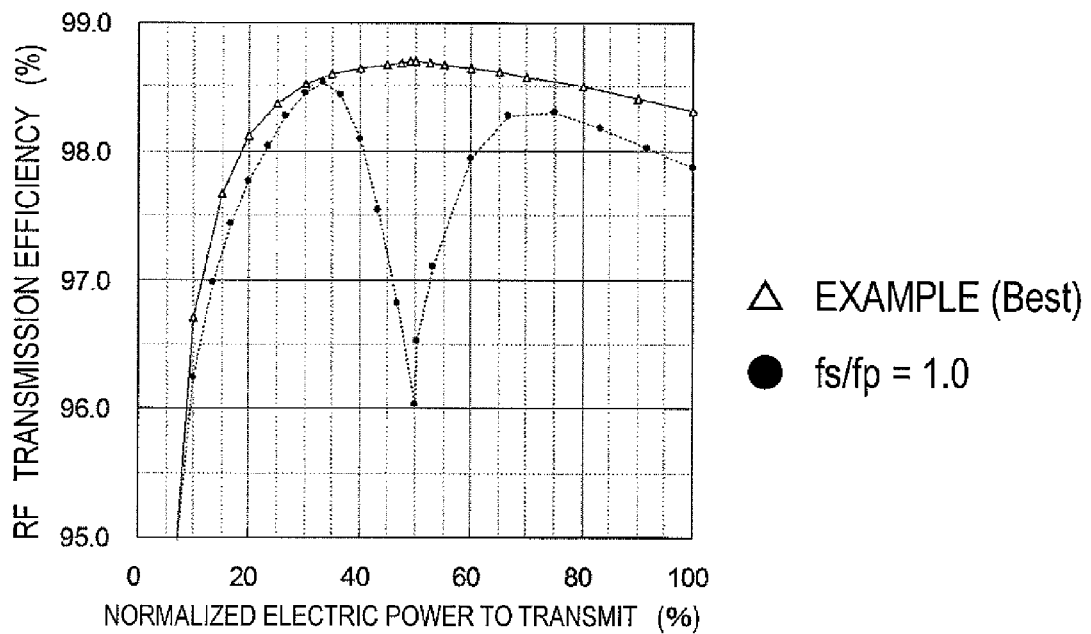
△ EXAMPLE (Best)
● fs/fp = 1.0
*FIG.19B* K = 0.3
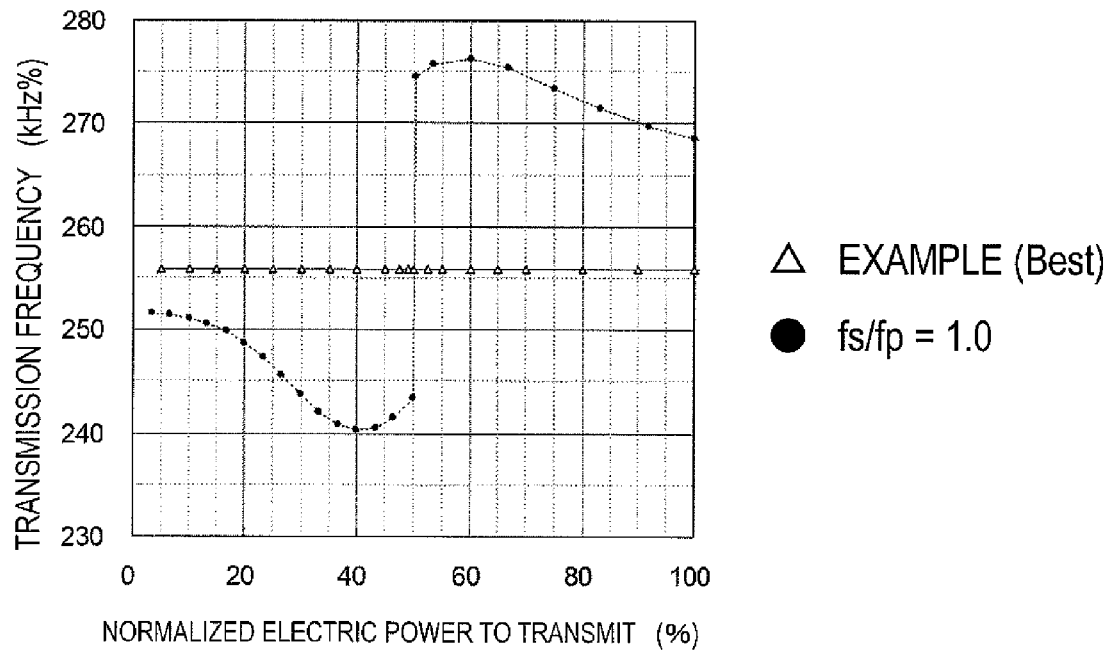
△ EXAMPLE (Best)
● fs/fp = 1.0

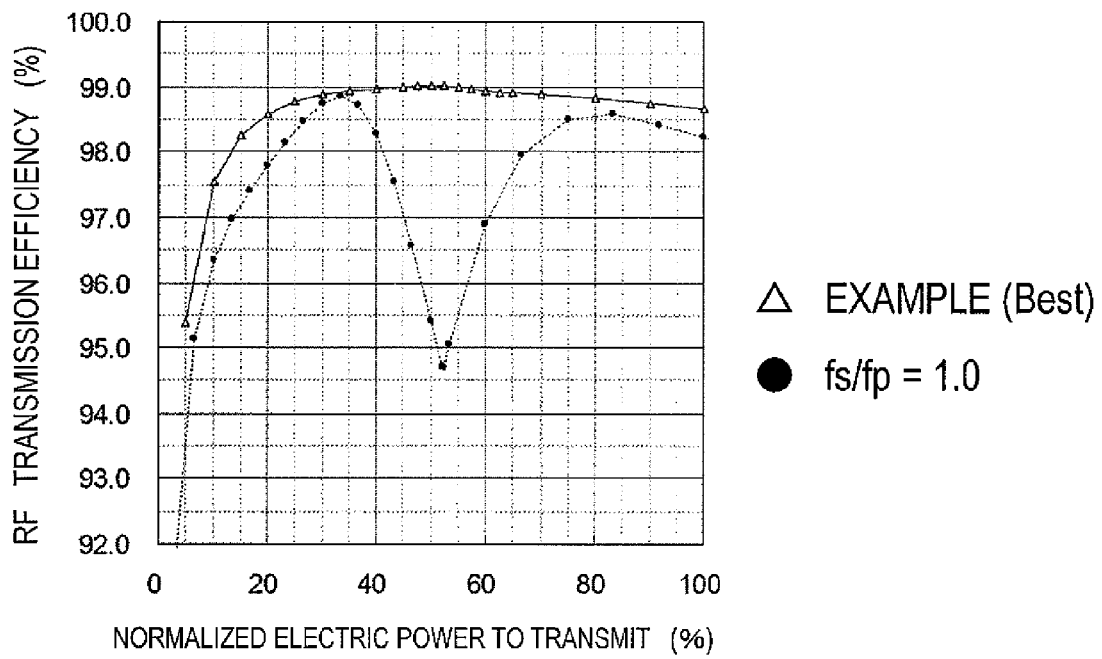
FIG.20A  K = 0.4
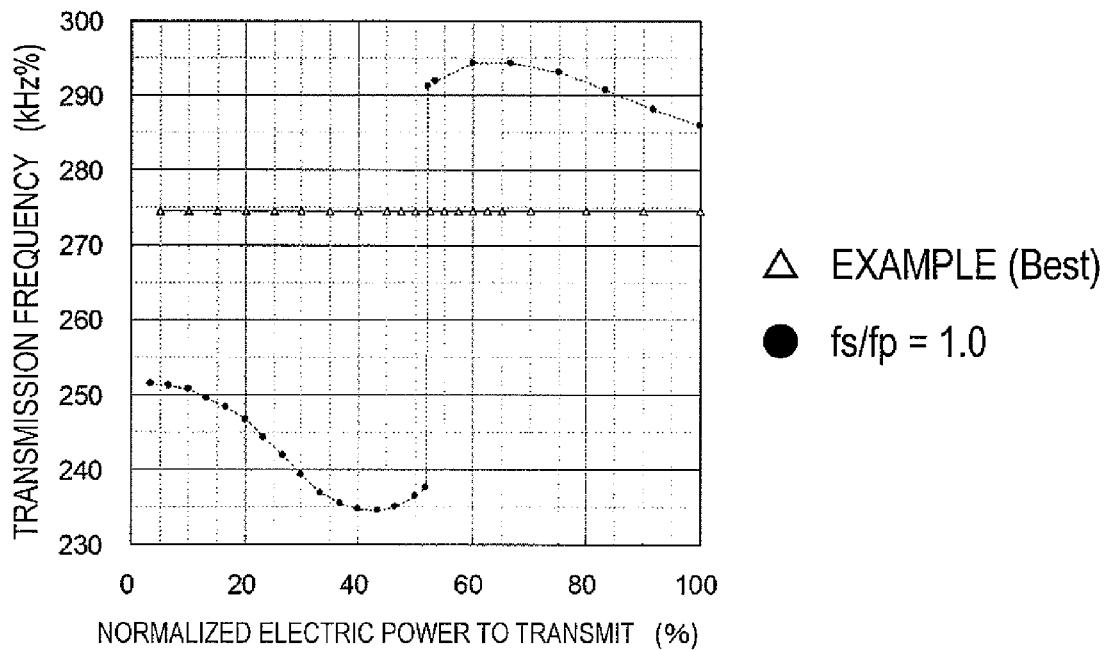
FIG.20B  K = 0.4

WIRELESS ELECTRIC POWER TRANSMISSION APPARATUS

This application claims priority under 35 USC §119(e) to U.S. Provisional Application No. 61/564,353 filed on Nov. 29, 2011, the entire contents of which are incorporated herein by reference.

BACKGROUND

1. Technical Field

The present disclosure relates to a resonant magnetic coupling type non-contact power transmission technology for transmitting electric power wirelessly using resonant magnetic coupling.

2. Description of the Related Art

U.S. Patent Application Publication No. 2008/0278264 (FIGS. 12 and 14) discloses a new type of wireless energy transfer system for transferring energy wirelessly (through a space) from one of two resonators to the other, and vice versa. That wireless energy transfer system couples those two resonators with each other via the evanescent tail of the oscillation energy of the resonant frequency that is produced in the space surrounding those two resonators, thereby transferring the oscillation energy wirelessly (i.e., by a non-contact method).

Meanwhile, the traditional electromagnetic induction technology is still used today. Many of electronic devices, to which these electric power transmission technologies are applied, often demand supply of a constant voltage after having received electric power with a constant voltage and gone through some kind of power conversion, voltage division, energy transfer and other blocks. For example, as for an audiovisual device such as a TV set, such a device usually receives electric power through an AC outlet that supplies AC power with a substantially constant voltage and individual circuits in the device, which eventually consume the power supplied, operate with a predetermined voltage maintained. Even if the brightness on the screen has varied, such a variation can also be coped with by changing the amount of current to flow. Such an operation of receiving electric power with a constant voltage from a power supply and outputting the power with the constant voltage to a load will be referred to herein as a "constant voltage operation".

SUMMARY

The prior art technique needs further improvement in view of maintaining high-efficiency transmission performance when the system needs to perform a constant voltage operation, no matter whether the power to be transmitted is large or small.

One non-limiting, and exemplary embodiment provides a wireless power transmission system that can output power with a predetermined output voltage in response to power received with a predetermined input voltage and that can maintain high efficiency not just when transmitting a huge amount of power but also when transmitting only a small amount of power as well.

In one general aspect, a wireless electric power transmission apparatus disclosed herein includes: two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; and an oscillator which is connected to one of the two antennas that transmits RF power. If the coupling coefficient between the two antennas is k, then fs and fp are set so as to satisfy the inequality $-1.1516 \times k^2 + 0.0363 \times k + 0.9983 \leq fs/fp < 1$.

Even when the electric power to transmit varies while the power is being transmitted between two antennas via resonant magnetic coupling, a wireless electric power transmission apparatus as an embodiment of the present disclosure can prevent the transmission efficiency from decreasing locally. According to an embodiment of the present disclosure, there is no need to change the transmission frequency anymore as the electric power to transmit varies.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 17A is a graph showing how the transmission efficiency changes with the electric power to transmit when k=0.1.

FIG. 17B is a graph showing how the transmission frequency changes with the electric power to transmit when k=0.1.

FIG. 18A is a graph showing how the transmission efficiency changes with the electric power to transmit when k=0.2.

FIG. 18B is a graph showing how the transmission frequency changes with the electric power to transmit when k=0.2.

FIG. 19A is a graph showing how the transmission efficiency changes with the electric power to transmit when k=0.3.

FIG. 19B is a graph showing how the transmission frequency changes with the electric power to transmit when k=0.3.

FIG. 20A is a graph showing how the transmission efficiency changes with the electric power to transmit when k=0.4.

FIG. 20B is a graph showing how the transmission frequency changes with the electric power to transmit when k=0.4.

DETAILED DESCRIPTION

Figure 1:
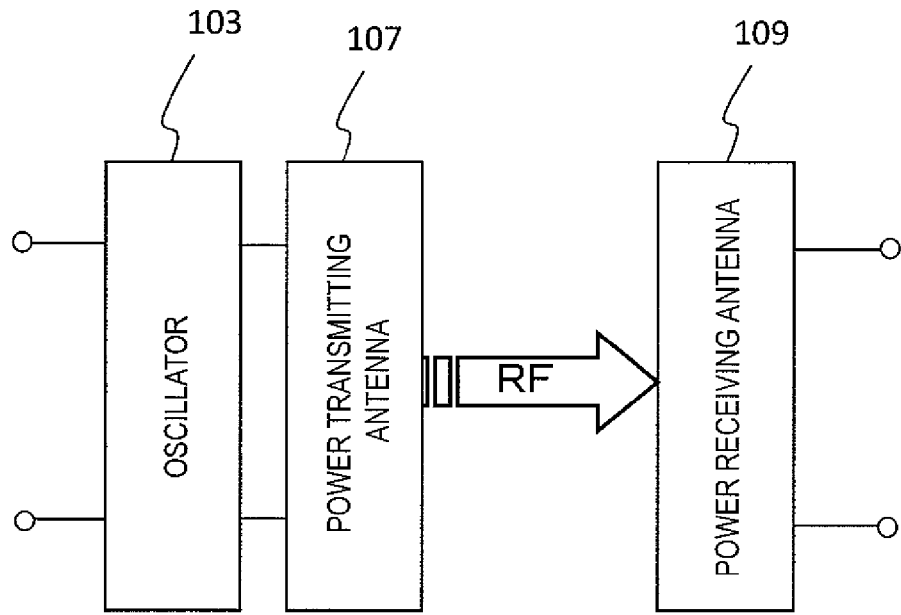
FIG. 1 illustrates an exemplary basic configuration for a wireless electric power transmission apparatus as an embodiment of the present disclosure.

The present inventors found that it is difficult for the wireless energy transfer system disclosed in U.S. Patent Application Publication No. 2008/0278264 to always maintain a high efficiency transfer characteristic in performing such a constant voltage operation all the time, no matter whether the power to be transmitted is large or small.

An exemplary embodiment of the present disclosure provides a wireless electric power transmission apparatus that can always maintain sufficiently high efficiency, not just when the power to transmit is big but also when only a little power needs to be transmitted.

In one general aspect, a wireless electric power transmission apparatus disclosed herein includes: two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; and an oscillator which is connected to one of the two antennas that transmits RF power. If the coupling coefficient between the two antennas is k, then fs and fp are set so as to satisfy the inequality $-1.1516 \times k^2 + 0.0363 \times k + 0.9983 \leq fs/fp < 1$.

In one embodiment, if $0.1 \leq k < 0.27$, then $-1.1516 \times k^2 + 0.0363 \times k + 0.9983 \leq fs/fp < 1$ is satisfied, if $0.27 \leq k < 0.32$, then $-1.1516 \times k^2 + 0.0363 \times k + 0.9983 \leq fs/fp < -0.0979 \times k^2 - 0.1347 \times k + 1.044$ is satisfied, and if $0.32 \leq k \leq 0.5$, then $-0.7074 \times k^2 - 0.0724 \times k + 0.9876 \leq fs/fp < -0.0979 \times k^2 - 0.1347 \times k + 1.044$ is satisfied.

In another embodiment, if $0.1 \leq k < 0.26$, then $-1.1516 \times k^2 + 0.0363 \times k + 0.9983 \leq fs/fp < 1$ is satisfied, if $0.26 \leq k < 0.29$, then $-0.7309 \times k^2 - 0.0269 \times k + 0.9862 \leq fs/fp < 1$ is satisfied, and if $0.29 \leq k < 0.5$, then $-0.7309 \times k^2 - 0.0269 \times k + 0.9862 \leq fs/fp < 0.08 \times k^2 - 0.357 \times k + 1.0944$ is satisfied.

In another embodiment, if $0.1 \leq k < 0.19$, then $-1.1516 \times k^2 + 0.0363 \times k + 0.9983 \leq fs/fp < 1$ is satisfied, if $0.19 \leq k < 0.21$, then $-0.7348 \times k^2 + 0.087 \times k + 0.9889 \leq fs/fp < 1$ is satisfied, and if $0.21 \leq k \leq 0.5$, then $-0.7348 \times k^2 + 0.087 \times k + 0.9889 \leq fs/fp < -0.5377 \times k^2 + 0.10018 \times k + 1.00106$ is satisfied.

In another embodiment, if $0.1 \leq k < 0.15$, then $-1.1516 \times k^2 + 0.0363 \times k + 0.9983 \leq fs/fp < 1$ is satisfied, and if $0.15 \leq k < 0.5$, then $-0.7242 \times k^2 + 0.0329 \times k + 0.9894 \leq fs/fp < -0.5183 \times k^2 + 0.0603 \times k + 1.0016$ is satisfied.

In another embodiment, fs and fp are set so as to satisfy the equation $fs/fp = -0.6074 \times k^2 + 0.0466 \times k + 0.9955$.

In another embodiment, the wireless electric power transmission apparatus further comprises a resonant frequency adjustment circuit which changes at least one of fs and fp.

In another embodiment, the wireless electric power transmission apparatus further comprises a controller which controls the resonant frequency adjustment circuit and which changes at least one of fs and fp according to the value of the coupling coefficient k.

In another embodiment, even if power to transmit changes, the frequency of the RF power is kept constant.

In another embodiment, the wireless electric power transmission apparatus further comprises a controller which controls the resonant frequency adjustment circuit and which changes at least one of fs and fp, and after the wireless electric power transmission apparatus has been installed, the controller transmits electric power wirelessly with fs/fp set to be multiple different values, measures transmission efficiency, and then determines an fs/fp value for a normal operation based on the transmission efficiency.

In another aspect, a power transmitting device for use in the wireless electric power transmission apparatus disclosed herein includes: one of the two antennas that transmits RF power; and an oscillator that is connected to the antenna.

In another aspect, a power receiving device for use in the wireless electric power transmission apparatus disclosed herein includes one of the two antennas configured to receive RF power.

In another aspect, a controller for use in the wireless electric power transmission apparatus disclosed herein is configured to control the resonant frequency adjustment circuit and change at least one of fs and fp according to the value of the coupling coefficient k.

Hereinafter, embodiments of the present disclosure will be described more concretely.

As shown in FIG. 1, a wireless electric power transmission apparatus as an embodiment of the present disclosure includes two antennas (namely, a power transmitting antenna 107 and a power receiving antenna 109), from one of which RF power can be transmitted to the other by a non-contact method via resonant magnetic coupling, and an oscillator 103 which is connected to the power transmitting antenna 107 on the RF power transmitting end. One of the power transmitting antenna 107 and the power receiving antenna 109 is a series resonant circuit, of which the resonant frequency is fs, and the other is a parallel resonant circuit, of which the resonant frequency is fp. The power receiving antenna 109 is not in contact with the power transmitting antenna 107 but is located at a distance of about several millimeters to about several ten centimeters from the power transmitting antenna 107, for example. The frequency of the RF power to be transmitted (which will be referred to herein as "transmission frequency") may be set to fall within the range of 50 Hz to 300 GHz. The transmission frequency suitably falls within the range of 20 kHz to 10 GHz, more suitably within the range of 20 kHz to 20 MHz, and even more suitably within the range of 20 kHz to 1 MHz. In one embodiment, the transmission frequency is set to be 6.78 MHz.

The oscillator 103 receives DC or AC energy (electric power) that is supplied from a power supply, and performs frequency conversion (which may be either DC/RF conversion or AC/RF conversion) on the supplied energy, thereby turning it into RF power with the transmission frequency. The RF power output from the oscillator 103 is supplied to the power transmitting antenna 107. In transmitting the electric power, the power transmitting antenna 107 and the power receiving antenna 109 are magnetically coupled together via a resonant magnetic field that is produced by their resonators in the surrounding space. The output section of the power receiving antenna 109 is connected to a load. Optionally, a frequency converter may be connected to the output section of the power receiving antenna 109.

In the wireless electric power transmission apparatus according to this embodiment of the present disclosure, the "antenna" is not an ordinary antenna for transmitting or receiving an electromagnetic field radiated but an element for transferring energy from one of two objects to the other, and vice versa, by using a coupling phenomenon that has been produced by the evanescent tail of the magnetic field of the resonator. According to such a wireless electric power transmission technique that uses the resonant magnetic field, energy loss (radiation loss), which would otherwise be caused when an electromagnetic wave is transferred to a distant location, will not be caused, and therefore, the electric power can be transmitted with very high efficiency. Such an energy transfer technique that uses the coupling phenomenon of a resonant electromagnetic field (i.e., a near field) will cause much less loss than a known wireless electric power transmission that uses the Faraday's law of electromagnetic induction. Rather, energy can be transmitted efficiently between two resonators (or antennas), which have an interval of as long as several meters between them.

To carry out a wireless electric power transmission based on such a principle, coupling needs to be produced between two resonant antennas. fs and/or fp do not have to be exactly equal to the transmission frequency. To transfer energy with high efficiency by taking advantage of the coupling phenomenon between the two resonators, fs is set to be smaller than fp in an embodiment of the present disclosure.

Figure 2:
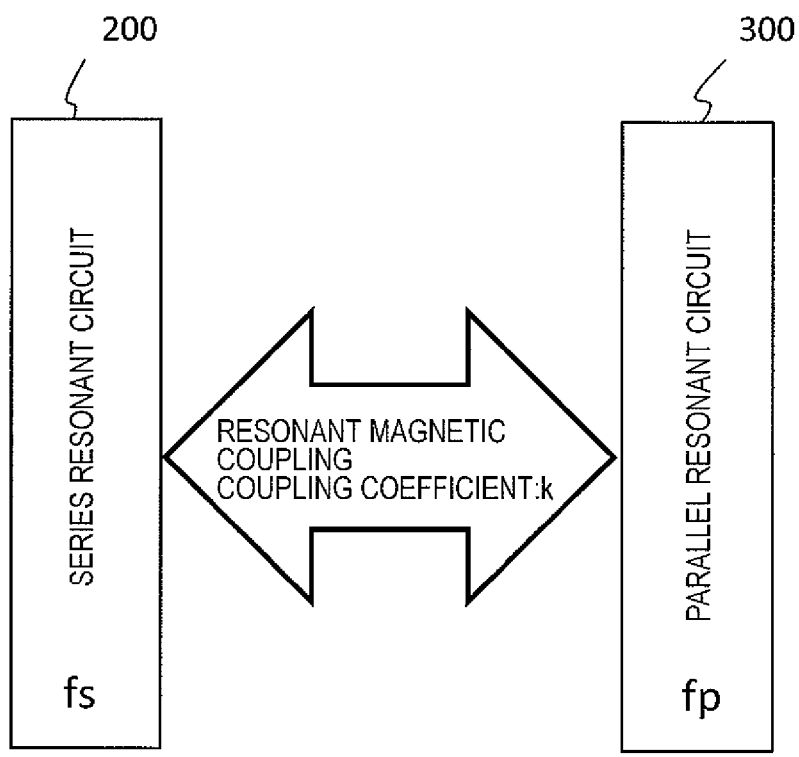
FIG. 2 schematically illustrates how two resonant circuits are coupled together in a wireless electric power transmission apparatus as an embodiment of the present disclosure.

FIG. 2 schematically illustrates how resonant magnetic coupling is produced at a coupling coefficient k between a series resonant circuit 200 with a resonant frequency fs and a parallel resonant circuit 300 with a resonant frequency fp.

In general, it is known that when two resonators that have their own resonant frequencies are electrically coupled together, those resonant frequencies will change. Even if the resonant frequencies of the two resonators are the same, the resonant frequency of the pair of resonators splits into two frequencies as a result of the coupling. Of the two resonant frequencies of the pair of resonators that are coupled together, the higher one will be referred to herein as an "even-mode resonant frequency fH" and the lower one as an "odd-mode resonant frequency fL", respectively. In this case, the coupling coefficient k between the resonators is represented by the following Equation (1):

$$k = (fH^2 - fL^2) \div (fH^2 + fL^2) \tag{1}$$

In this case, the stronger the degree of coupling, the greater the k value and the bigger the difference between the two resonant frequencies that have split. In an embodiment of the present disclosure, k is set to be a relatively small value, e.g., within the range $0 < k \le 0.5$. The k value could be greater than 0.5. However, by setting the k value to be equal to or smaller than 0.5, various effects unique to the resonant magnetic coupling method, including an increased distance between the power transmitting and receiving antennas and asymmetry in size between the power transmitting and receiving antennas, can be achieved significantly.

Figure 3A:
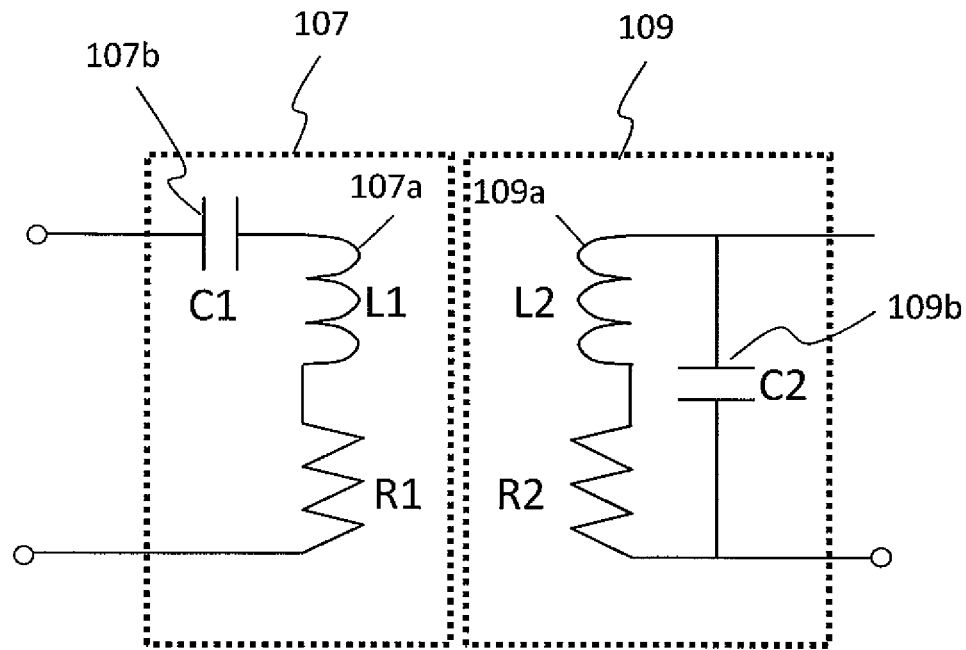
FIG. 3A illustrates an exemplary equivalent circuit for a pair of antennas for use in a wireless electric power transmission apparatus as an embodiment of the present disclosure.
Figure 3B:
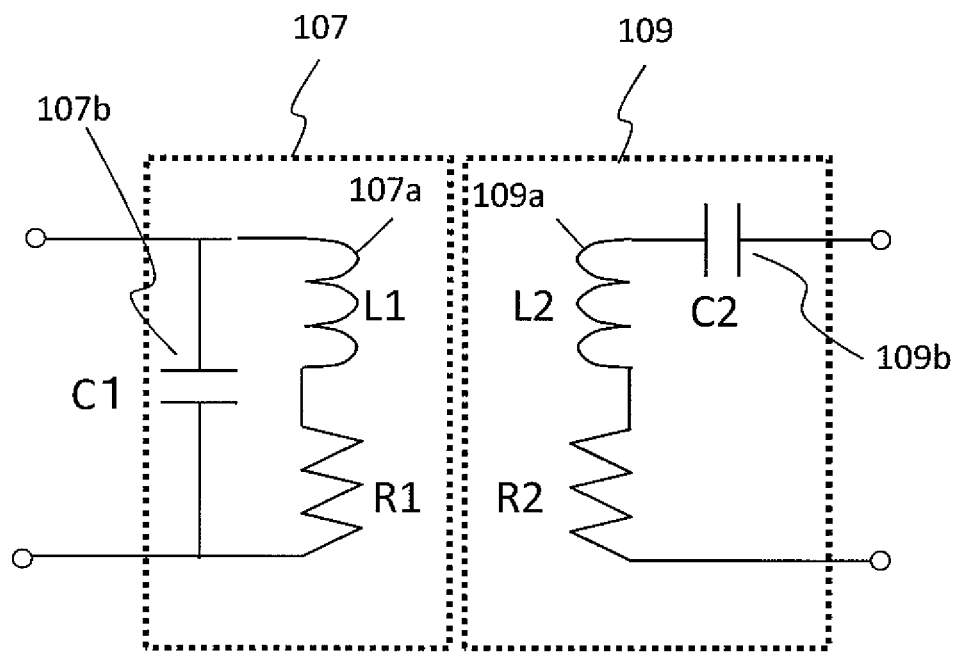
FIG. 3B illustrates another exemplary equivalent circuit for a pair of antennas for use in a wireless electric power transmission apparatus as an embodiment of the present disclosure.

FIG. 3A is an equivalent circuit diagram illustrating a configuration in which the power transmitting antenna 107 is implemented as a series resonant circuit and the power receiving antenna 109 is implemented as a parallel resonant circuit. In the exemplary configuration shown in FIG. 3A, the power transmitting antenna 107 is a series resonant circuit in which a first inductor 107a and a first capacitor 107b are connected together in series, while the power receiving antenna 109 is a parallel resonant circuit in which a second inductor 109a and a second capacitor 109b are connected together in parallel. The series resonant circuit of the power transmitting antenna 107 has a parasitic resistance component R1 and the parallel resonant circuit of the power receiving antenna 109 has a parasitic resistance component R2. In an embodiment of a wireless electric power transmission apparatus according to the present disclosure, the power transmitting antenna 107 and the power receiving antenna 109 are implemented as an asymmetric combination consisting of a series resonant circuit and a parallel resonant circuit. In an alternative embodiment of the present disclosure, the power transmitting antenna 107 may be implemented as a parallel resonant circuit and the power receiving antenna 109 may be implemented as a series resonant circuit as shown in FIG. 3B. By setting the k value to be equal to or smaller than 0.5 and by implementing the power transmitting antenna and the power receiving antenna as a series resonant circuit and a parallel resonant circuit, respectively, the effect of increasing the voltage received after the electric power has been transmitted can be achieved significantly. On the other hand, by setting the k value to be equal to or smaller than 0.5 and by implementing the power transmitting antenna and the power receiving antenna as a parallel resonant circuit and a series resonant circuit, respectively, the effect of decreasing the voltage received after the electric power has been transmitted can also be achieved significantly.

Figure 4A:
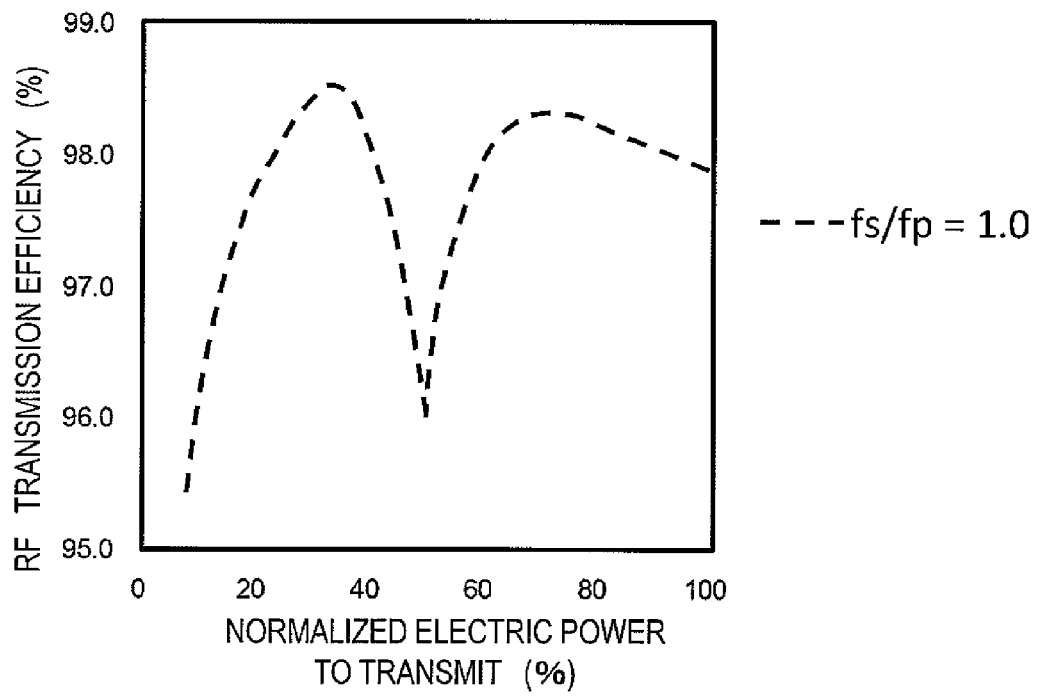
FIG. 4A is a graph showing how the transmission efficiency changes with the electric power to transmit when fs/fp=1.0.

In this description, the ratio fs/fp of the resonant frequency fs of a series resonant circuit to the resonant frequency fp of a parallel resonant circuit will be referred to herein as a "resonant frequency ratio". The present inventors discovered that when the resonant frequency ratio fs/fp was set to be equal to 1.0, the transmission efficiency decreased with the electric power to transmit, which is a problem. FIG. 4A is a graph illustrating such a problem. That is to say, this graph shows how the transmission efficiency changes with the electric power to transmit in a situation where fs/fp=1.0. In the graph shown in FIG. 4A, the abscissa represents the electric power to transmit that is normalized with a certain value of the electric power to transmit (which will be referred to herein as "normalized electric power to transmit" (of which the unit is %)). Although any value may be used for the normalization, the maximum value of the electric power to transmit may be used, for example. In this description, this "normalized electric power to transmit" will be sometimes simply referred to herein as "electric power to transmit". In the example illustrated in FIG. 4A, when the electric power to transmit is approximately 50%, a steep decrease in transmission efficiency is observed. Such a steep drop in transmission efficiency will be referred to herein as "Dip". The present inventors discovered that in order to minimize such a decrease in transmission efficiency, it is effective to change the transmission frequency according to the electric power to transmit. And the present inventors further discovered that if the fs/fp ratio was set to fall within a particular range that had been determined according to the coupling coefficient k, the magnitude of such a decrease in transmission efficiency due to a variation in the electric power to transmit (i.e., the magnitude of Dip) could be reduced, thus perfecting our invention. According to an embodiment of the present disclosure, the decrease in transmission efficiency can be minimized even without changing the transmission frequency with the electric power to transmit.

Figure 4B:
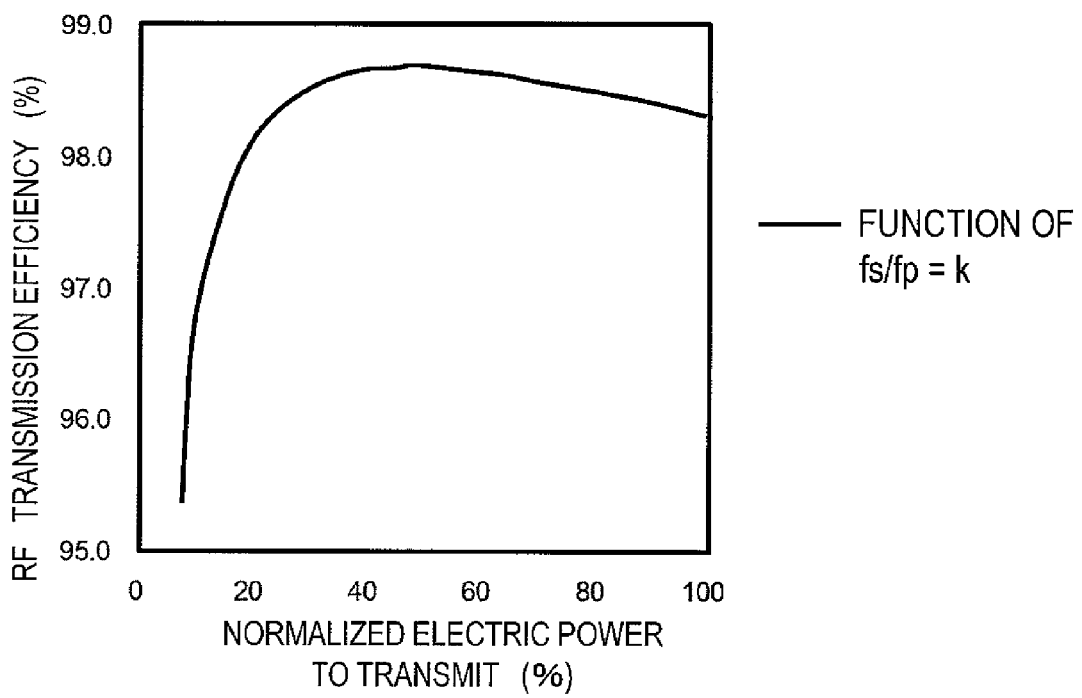
FIG. 4B is a graph showing how the transmission efficiency changes with the electric power to transmit in a wireless electric power transmission apparatus in which the fs/fp ratio is set to be the best value (which is a function of k) to be determined by the coupling coefficient k.

FIG. 4B is a graph showing how the transmission efficiency changes with the electric power to transmit in a wireless electric power transmission apparatus in which the fs/fp ratio is set to be the best value that is determined by the coupling coefficient k (which is a function of k). Comparing the solid curve shown in FIG. 4B to the dashed curve shown in FIG. 4A, it can be seen easily that by setting the fs/fp ratio to be the best value that is determined by the coupling coefficient k, the decrease in transmission efficiency due to a variation in electric power to transmit can be minimized.

Hereinafter, the relation between the fs/fp ratio and the coupling coefficient will be described.

Figure 5:
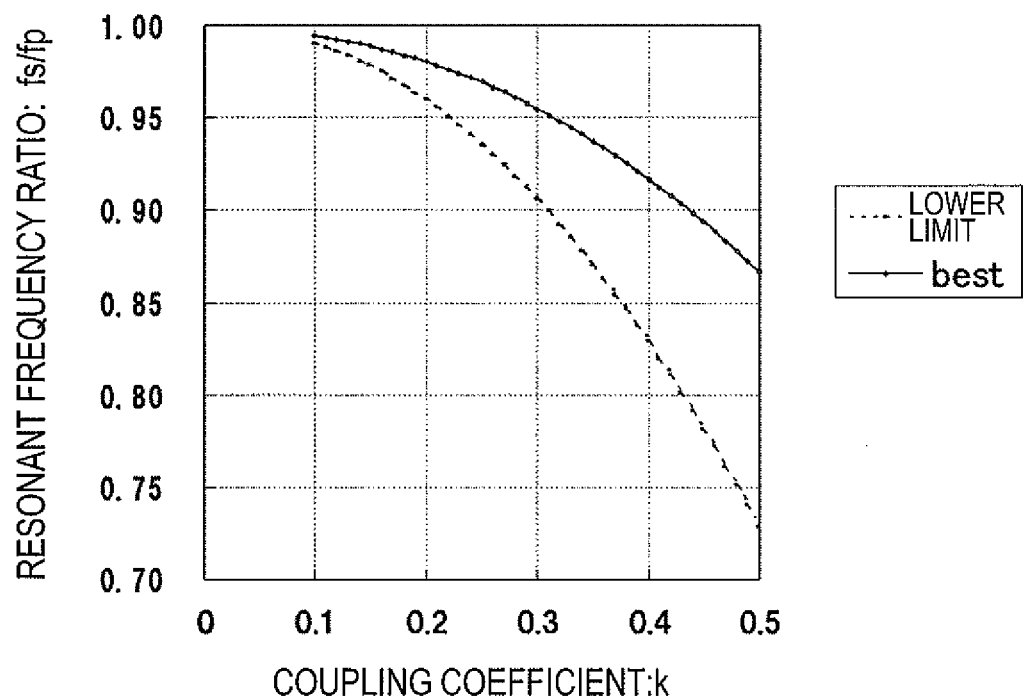
FIG. 5 is a graph showing how the best fs/fp ratio changes with the coupling coefficient k.

First of all, look at FIG. 5, which is a graph showing how the resonant frequency ratio fs/fp (represented by the ordinate) changes with the coupling coefficient k (represented by the abscissa). In FIG. 5, the solid curve represents a quadratic equation given by the following Equation (2):

$$fs/fp = F(k) = -0.6074 \times k^2 + 0.0466 \times k + 0.9955 \quad (2)$$

This Equation (2) represents the best fs/fp ratio when a coupling coefficient k is given. In this case, the fs/fp ratio is called the "best" because if the fs/fp ratio is varied, then the local decrease in transmission efficiency such as the one shown in FIG. 4A can be minimized. It does not mean that even if the fs/fp ratio is the best one, the local decrease in transmission efficiency can be eliminated altogether.

Figure 6:
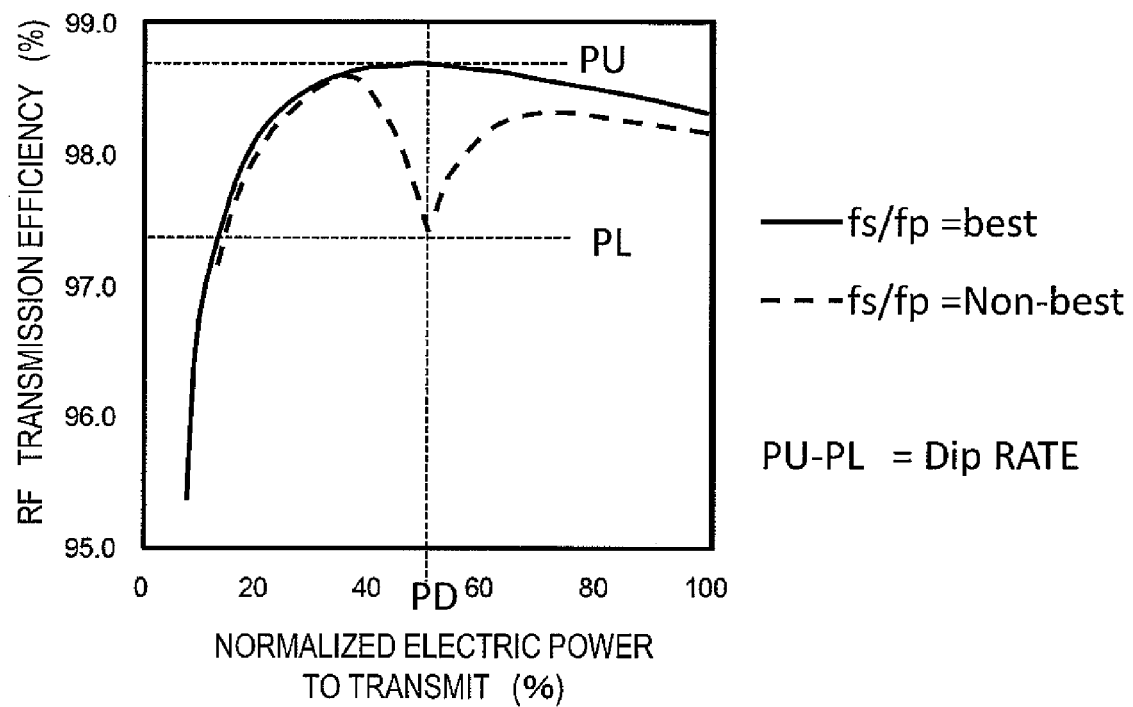
FIG. 6 is a graph showing what the "Dip rate" means.

In this description, in order to estimate the degree of decrease in transmission efficiency, a value called "Dip rate" is introduced. FIG. 6 is a graph showing what the "Dip rate" means. In FIG. 6, the dashed curve shown in FIG. 4A and the solid curve shown in FIG. 4B are both shown. As for the curve with the Dip portion in which the transmission efficiency decreases locally, the electric power to transmit, at which the transmission efficiency becomes a local minimum, is identified by PD and the transmission efficiency at the electric power to transmit PD is identified by PL. On the other hand, as for the curve in which the fs/fp ratio is adjusted to be the best one, the transmission efficiency at the electric power to transmit PD is identified by PU. In this case, the Dip rate is obtained by calculating PU-PL. The best Dip rate is 0% but the actual Dip rate does not always have to be 0%. In one embodiment of the present disclosure, the local decrease in transmission efficiency can be minimized so that the Dip rate becomes equal to or smaller than 3%.

In FIG. 5, also shown is the dotted curve represented by the following Equation (3):

$$fs/fp = -1.1516 \times k^2 + 0.0363 \times k + 0.9983 \quad (3)$$

If the fs/fp ratio is less than one and equal to or greater than the value represented by Equation (3), then the Dip rate can be reduced compared to the situation where fs/fp=1. That is why according to the present disclosure, the resonant frequencies fs and fp are set so as to satisfy the following Equation (4):

$$-1.1516 \times k^2 + 0.0363 \times k + 0.9983 \leq fs/fp < 1 \quad (4)$$

According to an embodiment of the present disclosure, the fs/fp ratio is adjusted so as to fall within the range defined by this Equation (4) and determined by the magnitude of the given k. In this case, the "magnitude of the given k" may refer herein to the "magnitude of k that has been set in advance during a design process" or the "magnitude of k that has been measured directly after the antennas have been installed", or the "magnitude of k that has been estimated by either measuring or monitoring a physical parameter that varies with k after the antennas have been installed". Also, "to adjust the fs/fp ratio" may refer herein to not only changing dynamically at least one of fs and fp but also setting the circuit parameters of a resonator so as to realize an fs/fp ratio of an appropriate magnitude and providing a resonator that realizes an fs/fp ratio of an appropriate magnitude.

According to the result of computer simulations, the closer to the value determined by the quadratic equation (2) the fs/fp value gets, the more significantly the Dip rate can be reduced. Also, even though fs and fp are determined by the product of the inductance of an inductor that forms part of a resonant circuit and the capacitance of a capacitor that forms another part of the resonant circuit, the condition for achieving the effects of the present disclosure does not depend on the ratio of the inductance to the capacitance of each resonant circuit.

Figure 7:
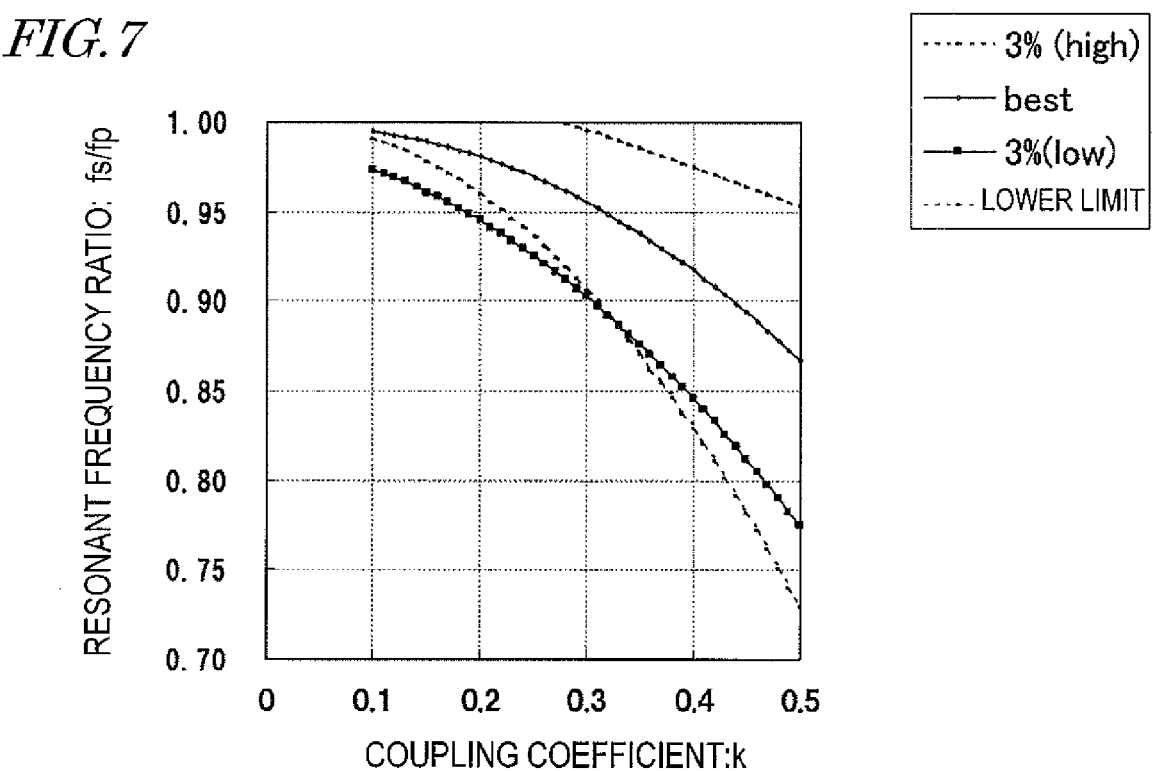
FIG. 7 is a graph showing a curve (identified by "high") that defines the upper limit of the fs/fp range in which the Dip rate becomes equal to or smaller than 3%, a curve (identified by "low") that defines the lower limit of that fs/fp range, a curve that defines the best value (identified by "best"), and a curve (identified by "lower limit") that defines the lower limit at or over which effects can be achieved compared to a situation where fs/fp=1.

FIG. 7 is a graph showing a curve (identified by "high") that defines the upper limit of the fs/fp range in which the Dip rate becomes equal to or smaller than 3%, a curve (identified by "low") that defines the lower limit of that fs/fp range, and a curve that defines the best value (identified by "best"). In FIG. 7, also shown is a curve (identified by "lower limit") that defines the lower limit at or over which the configuration of the present disclosure can improve the characteristic about the Dip rate with respect to the configuration in which fs/fp=1. If fs and fp are set so as to satisfy the relations represented by the following Equations (5a) through (5c), the Dip rate can be reduced to 3% or less. As a result, electric power can be transmitted at a lower Dip rate than in the known configuration in which fs/fp=1.

If $0.1 \leq k < 0.27$, then $$-1.1516 \times k^2 + 0.0363 \times k + 0.9983 \leq fs/fp < 1 \quad (5a)$$

If $0.27 \leq k < 0.32$, then $$-1.1516 \times k^2 + 0.0363 \times k + 0.9983 \leq fs/fp < -0.0979 \times k^2 - 0.1347 \times k + 1.044 \quad (5b)$$

If $0.32 \leq k \leq 0.5$, then $$-0.7074 \times k^2 - 0.0724 \times k + 0.9876 \leq fs/fp < -0.0979 \times k^2 - 0.1347 \times k + 1.044 \quad (5c)$$

It should be noted that k=0.27 is a point where the 3% (high) curve shown in FIG. 7 intersects with fs/fp=1 and that k=0.32 is a point where the 3% (low) curve shown in FIG. 7 intersects with the lower limit curve.

Figure 8:
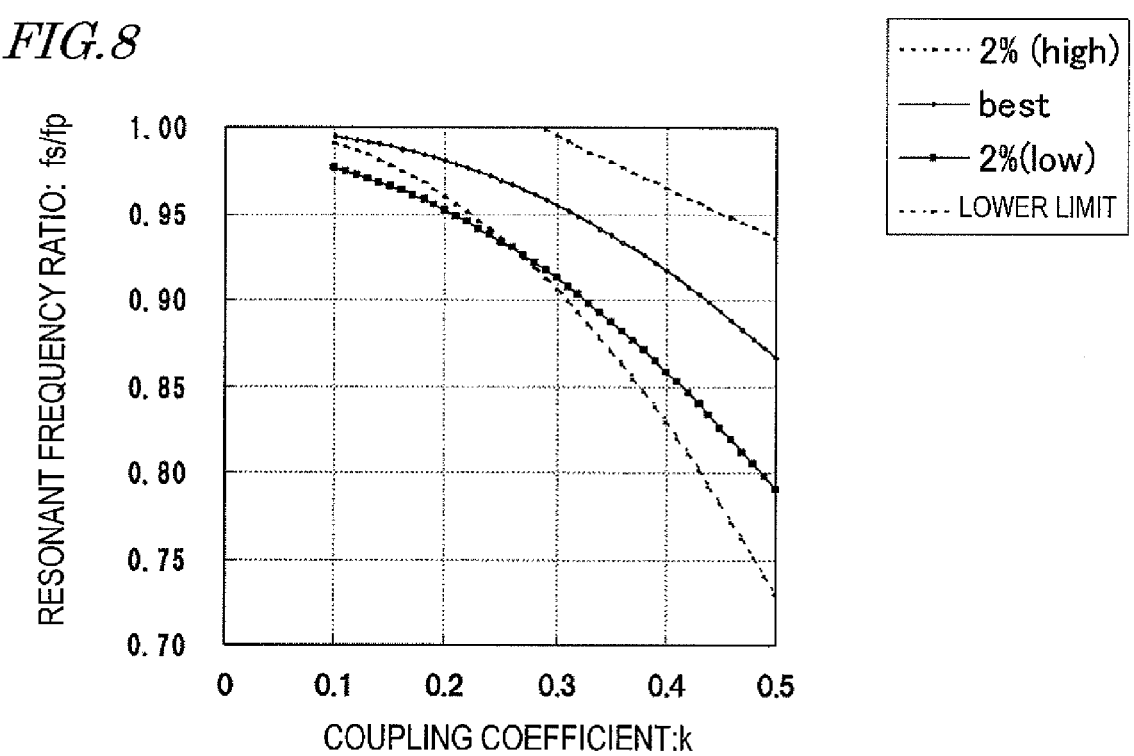
FIG. 8 is a graph showing a curve (identified by "high") that defines the upper limit of the fs/fp range in which the Dip rate becomes equal to or smaller than 2%, a curve (identified by "low") that defines the lower limit of that fs/fp range, a curve that defines the best value (identified by "best"), and a curve (identified by "lower limit") that defines the lower limit at or over which effects can be achieved compared to a situation where fs/fp=1.

FIG. 8 is a graph showing a curve (identified by "high") that defines the upper limit of the fs/fp range in which the Dip rate becomes equal to or smaller than 2%, a curve (identified by "low") that defines the lower limit of that fs/fp range, and a curve that defines the best value (identified by "best"). In FIG. 8, also shown is a curve (identified by "lower limit") that defines the lower limit at or over which the configuration of the present disclosure can improve the characteristic about the Dip rate with respect to the configuration in which fs/fp=1. If fs and fp are set so as to satisfy the relations represented by the following Equations (6a) through (6c), the Dip rate can be reduced to 2% or less. As a result, electric power can be transmitted at a lower Dip rate than in the known configuration in which fs/fp=1.

If $0.1 \leq k < 0.26$, then $$-1.1516 \times k^2 + 0.0363 \times k + 0.9983 \leq fs/fp < 1 \quad (6a)$$

If $0.26 \leq k < 0.29$, then $$-0.7309 \times k^2 - 0.0269 \times k + 0.9862 \leq fs/fp < 1 \quad (6b)$$

If $0.29 \leq k \leq 0.5$, then $$-0.7309 \times k^2 - 0.0269 \times k + 0.9862 \leq fs/fp < 0.08 \times k^2 - 0.357 \times k + 1.0944 \quad (6c)$$

It should be noted that k=0.29 is a point where the 2% (high) curve shown in FIG. 8 intersects with fs/fp=1 and that k=0.26 is a point where the 2% (low) curve shown in FIG. 8 intersects with the lower limit curve.

Figure 9:
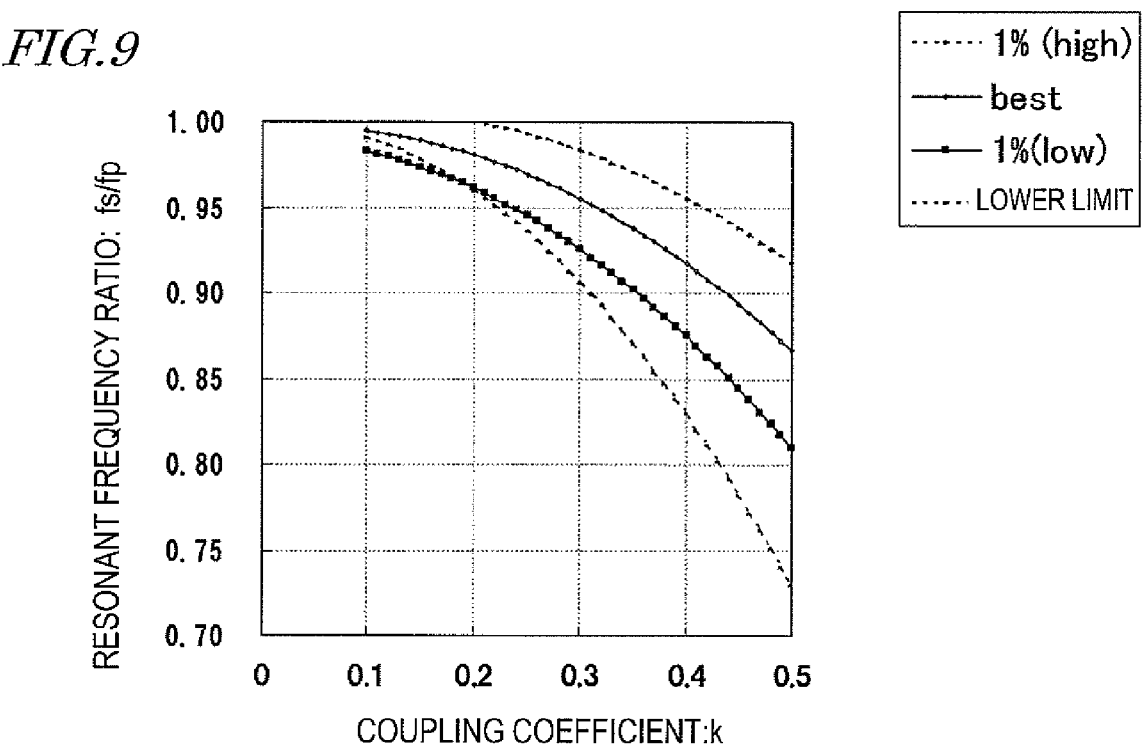
FIG. 9 is a graph showing a curve (identified by "high") that defines the upper limit of the fs/fp range in which the Dip rate becomes equal to or smaller than 1%, a curve (identified by "low") that defines the lower limit of that fs/fp range, a curve that defines the best value (identified by "best"), and a curve (identified by "lower limit") that defines the lower limit at or over which effects can be achieved compared to a situation where fs/fp=1.

FIG. 9 is a graph showing a curve (identified by "high") that defines the upper limit of the fs/fp range in which the Dip rate becomes equal to or smaller than 1%, a curve (identified by "low") that defines the lower limit of that fs/fp range, and a curve that defines the best value (identified by "best"). In FIG. 9, also shown is a curve (identified by "lower limit") that defines the lower limit at or over which the configuration of the present disclosure can improve the characteristic about the Dip rate with respect to the configuration in which fs/fp=1. If fs and fp are set so as to satisfy the relations represented by the following Equations (7a) through (7c), the Dip rate can be reduced to 1% or less. As a result, electric power can be transmitted at a lower Dip rate than in the known configuration in which fs/fp=1.

If $0.1 \leq k < 0.19$, then $$-1.1516 \times k^2 + 0.0363 \times k + 0.9983 \leq fs/fp < 1 \quad (7a)$$

If $0.19 \leq k < 0.21$, then $$-0.7348 \times k^2 + 0.087 \times k + 0.9889 \leq fs/fp < 1 \quad (7b)$$

If $0.21 \leq k \leq 0.5$, then $$-0.7348 \times k^2 + 0.087 \times k + 0.9889 \leq fs/fp < -0.5377 \times k^2 + 0.10018 \times k + 1.00106 \quad (7c)$$

It should be noted that k=0.21 is a point where the 1% (high) curve shown in FIG. 9 intersects with fs/fp=1 and that k=0.19 is a point where the 1% (low) curve shown in FIG. 9 intersects with the lower limit curve.

Figure 10:
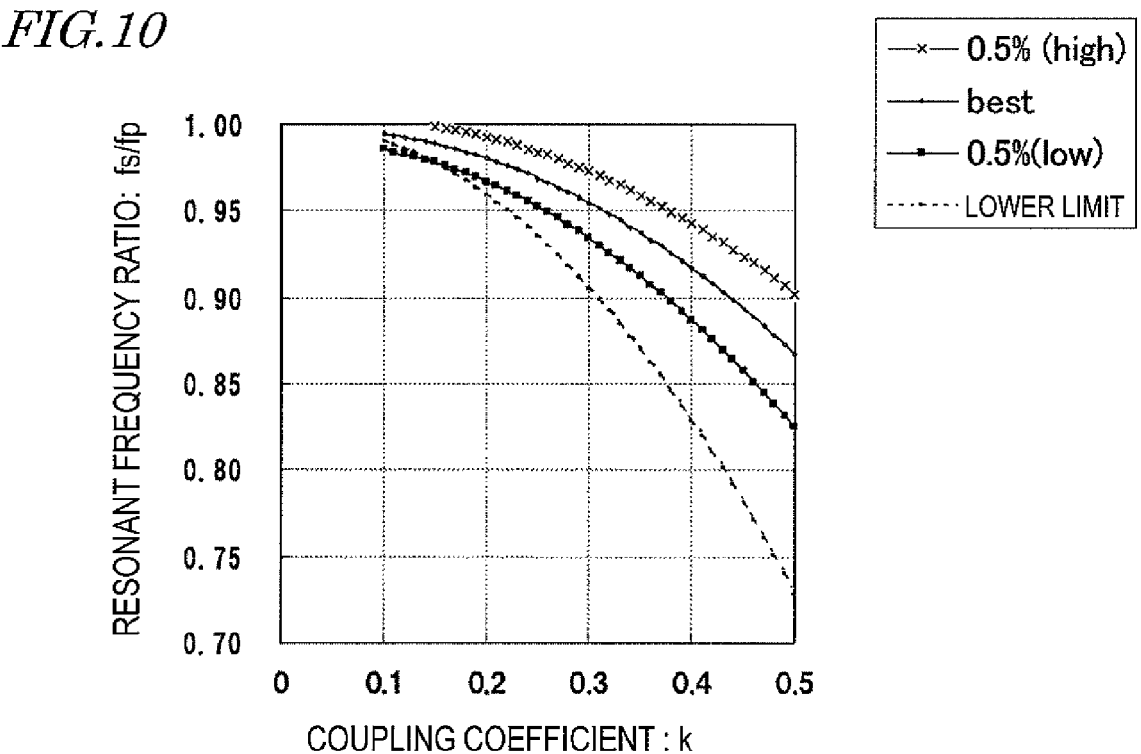
FIG. 10 is a graph showing a curve (identified by "high") that defines the upper limit of the fs/fp range in which the Dip rate becomes equal to or smaller than 0.5%, a curve (identified by "low") that defines the lower limit of that fs/fp range, a curve that defines the best value (identified by "best"), and a curve (identified by "lower limit") that defines the lower limit at or over which effects can be achieved compared to a situation where fs/fp=1.

FIG. 10 is a graph showing a curve (identified by "high") that defines the upper limit of the fs/fp range in which the Dip rate becomes equal to or smaller than 0.5%, a curve (identified by "low") that defines the lower limit of that fs/fp range, and a curve that defines the best value (identified by "best"). In FIG. 10, also shown is a curve (identified by "lower limit") that defines the lower limit at or over which the configuration of the present disclosure can improve the characteristic about the Dip rate with respect to the configuration in which fs/fp=1. If fs and fp are set so as to satisfy the relations represented by the following Equations (8a) and (8b), the Dip rate can be reduced to 0.5% or less.

If $0.1 = k < 0.15$, then $$-1.1516 \times k^2 + 0.0363 \times k + 0.9983 \leq fs/fp < 1 \quad (8a)$$

If $0.15 \leq k < 0.5$, then $$-0.7242 \times k^2 + 0.0329 \times k + 0.9894 \leq fs/fp < -0.5183 \times k^2 + 0.0603 \times k + 1.0016 \quad (8b)$$

It should be noted that k=0.15 is a point where the 0.5% (high) curve shown in FIG. 10 intersects with fs/fp=1 and where the 0.5% (low) curve intersects with the lower limit curve.

Hereinafter, it will be described how the wireless electric power transmission apparatus of the present disclosure may adjust the fs/fp ratio.

Figure 11:
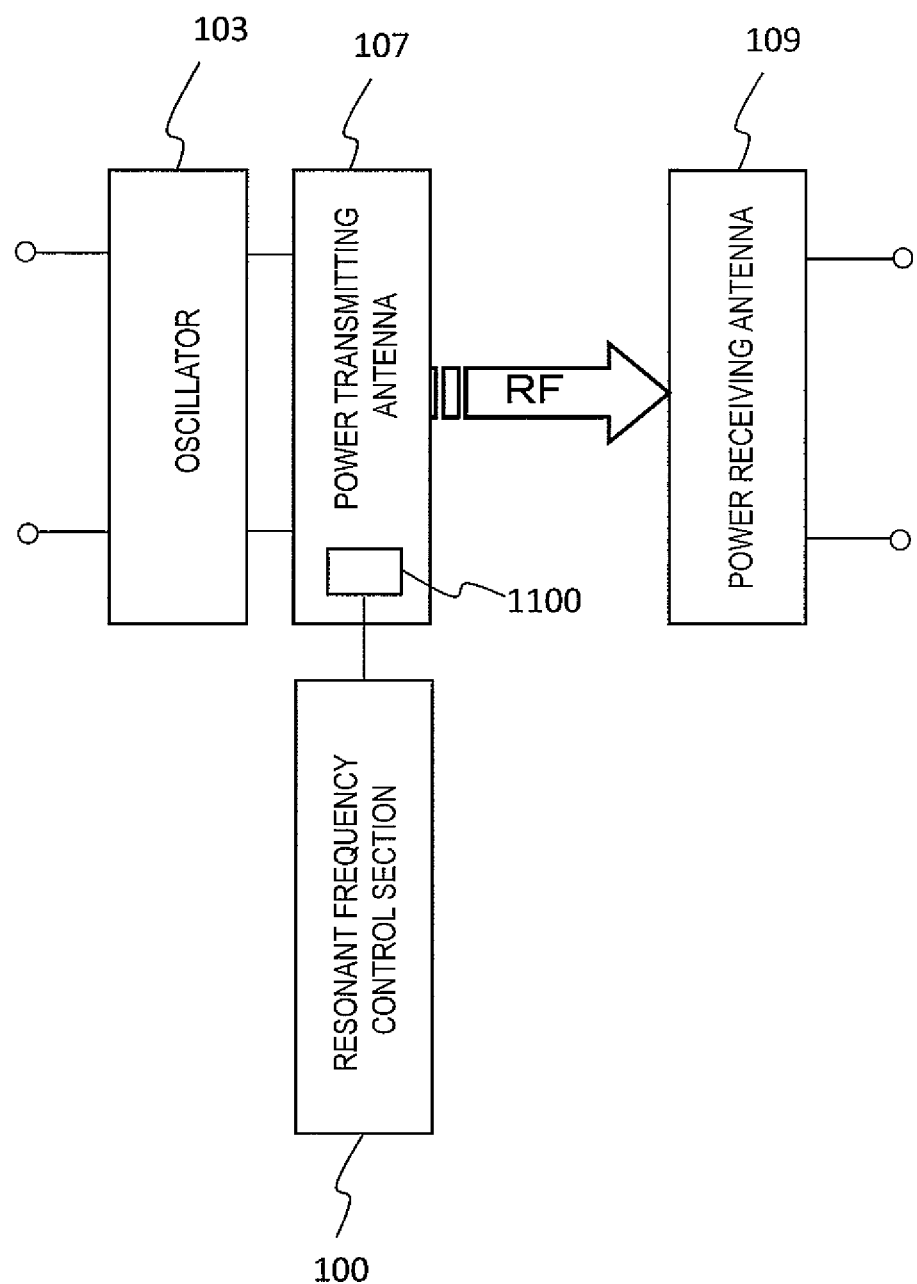
FIG. 11 is a block diagram illustrating an embodiment of a wireless electric power transmission apparatus in which a resonant frequency adjustment circuit 1100 is arranged in a power transmitting antenna 107.

First, look at FIG. 11. The wireless electric power transmission apparatus shown in FIG. 11 includes a power transmitting antenna 107, a power receiving antenna 109, and an oscillator 103 which is connected to the power transmitting antenna 107. And a resonant frequency adjustment circuit 1100 is built in the power transmitting antenna 107. In the exemplary configuration shown in FIG. 11, the resonant frequency adjustment circuit 1100 is connected to a resonant frequency control section 100.

In this embodiment, the basic configurations of the power transmitting and power receiving antennas 107 and 109 are respectively the series resonant circuit and parallel resonant circuit shown in FIG. 3A. And the resonant frequency fs of the series resonant circuit and the resonant frequency fp of the parallel resonant circuit are set so as to satisfy the relations represented by Equations (5a) through (5c), Equations (6a) through (6c), Equations (7a) through (7c) or Equations (8a) and (8b) according to the coupling coefficient k.

In the example illustrated in FIG. 11, the resonant frequency adjustment circuit 1100 is a circuit configured to adjust at least one of the inductance and capacitance of the power transmitting antenna 107. The resonant frequency adjustment circuit 1100 may have any of the two configurations shown in FIG. 12, for example. Each of these two resonant frequency adjustment circuits 1100 includes two capacitors C3 and C4 which have mutually different capacitances and a switching circuit SW which is connected in series to one of the two capacitors C3 and C4. By applying externally a control signal to the gates of the switching circuit SW, the switching circuit can be turned ON and OFF. And the magnitude of the capacitance of the power transmitting antenna 107 can be changed into any of two levels depending on whether the switching circuit SW is ON or OFF. As the number of capacitors C3 and C4 provided for the resonant frequency adjustment circuit 1100 is increased, the inductance of the power transmitting antenna 107 can be switched in an increasing number of stages.

By adjusting the capacitance of the power transmitting antenna 107 in this manner, the resonant frequency of the power transmitting antenna 107 can be changed. Optionally, the inductance of the power transmitting antenna may also be changed. The resonant frequency of the power transmitting antenna 107 may be adjusted by changing both the capacitance and inductance of the power transmitting antenna 107.

Figure 13:
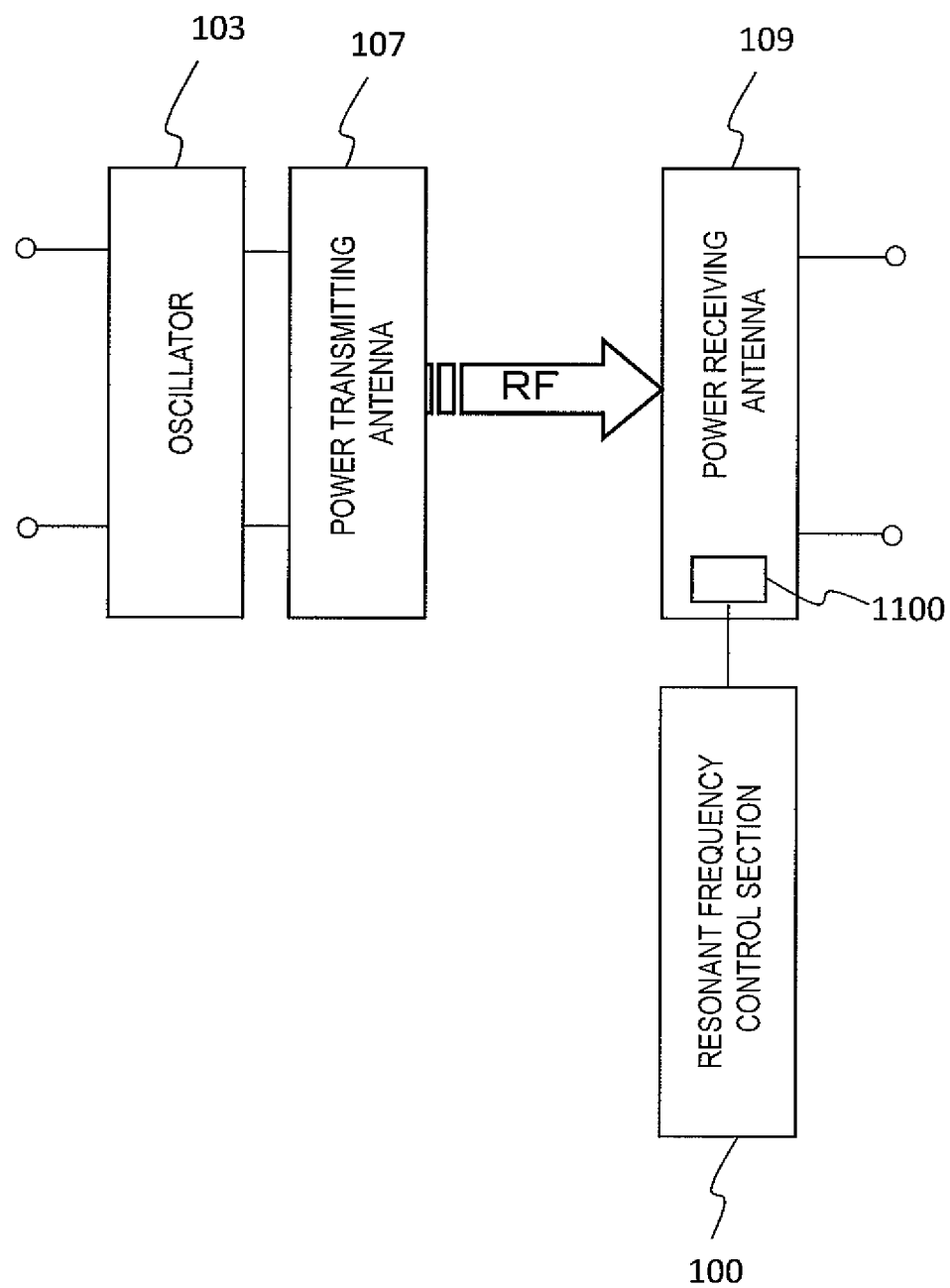
FIG. 13 is a block diagram illustrating an embodiment of a wireless electric power transmission apparatus in which a resonant frequency adjustment circuit 1100 is arranged in a power receiving antenna 109.

Although the resonant frequency adjustment circuit 1100 is provided for the power transmitting antenna 107 in the example described above, the resonant frequency adjustment circuit 1100 may also be provided for the power receiving antenna 109 as in the example shown in FIG. 13. Still alternatively, the resonant frequency adjustment circuit 1100 may be provided for each of the power transmitting antenna 107 and power receiving antenna 109.

Figure 12:
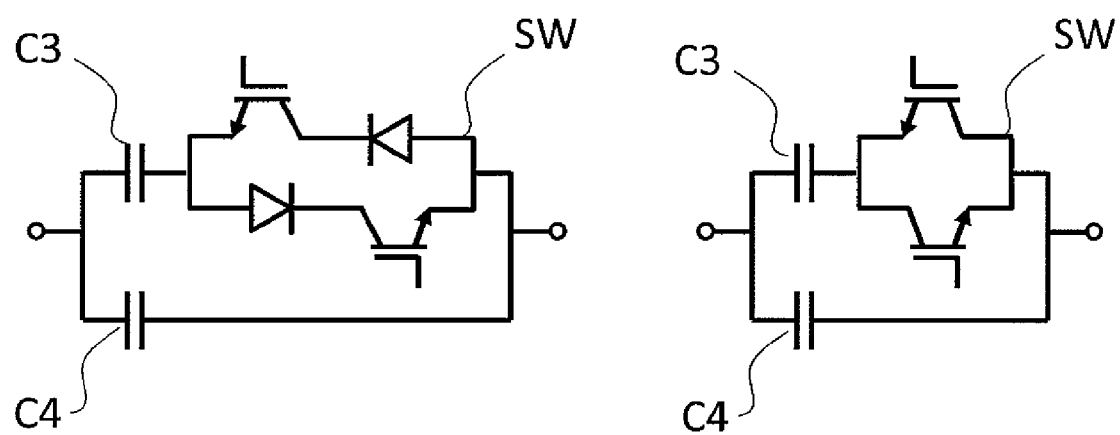
FIG. 12 illustrates two exemplary configurations for the resonant frequency adjustment circuit 1100.

The resonant frequency control section 100 is configured to generate a signal to control the operation of the switching circuit SW of the resonant frequency adjustment circuit 1100 shown in FIG. 12 and apply that control signal to the resonant frequency adjustment circuit 1100.

In the example described above, the resonant frequency of the power transmitting antenna 107 and/or the power receiving antenna 109 can be adjusted and varied even after the wireless electric power transmission apparatus has been installed. However, this is only an example of the present disclosure.

If it is possible to expect the value of the coupling coefficient k after the wireless electric power transmission apparatus according to an embodiment of the present disclosure has been installed, such a configuration that makes at least one of fs and fp variable does not have to be used by designing the inductors and capacitors so that an fs/fp value that has been calculated according to the coupling coefficient k is realized.

However, the characteristics of circuit components that form the power transmitting antenna 107 or the power receiving antenna 109 may vary from one component to another. That is why the fs/fp value may shift from the designed value. In that case, even if the actual value of the coupling coefficient k after the wireless electric power transmission apparatus has been installed agrees with the designed or expected value of the coupling coefficient k, it will be beneficial to provide the function of adjusting the fs/fp value for the wireless electric power transmission apparatus.

In addition, by providing a variable frequency control function in setting the resonant frequencies of the power transmitting and power receiving antennas, the fs/fp ratio can be adjusted arbitrarily.

Next, an exemplary method for adjusting the fs/fp value will be described with reference to FIG. 22. In this example, the coupling coefficient k is supposed to be 0.35.

First of all, in the first process step, the electric power to transmit is fixed at a certain electric power value P and the transmission frequency is changed to sweep its entire range while transmitting the electric power wirelessly as a test. In this manner, the maximum transmission efficiency hmax(P) at that electric power value P is detected. In this case, the electric power to be fixed may be set to be approximately a half of the maximum electric power that the transmission system can transmit, for example.

Next, in the second process step, the resonant frequency ratio fs/fp of the power transmitting and power receiving antennas is changed from its initial value. If the power transmitting antenna or the power receiving antenna is provided with the function of varying and controlling the resonant frequency, the fs/fp value can also be adjusted even after the wireless electric power transmission apparatus has been installed. For example, suppose the fs/fp value that was located at the point A shown in FIG. 22 under the initial condition has shifted to the point B1 by changing the resonant frequency of at least one of the power transmitting and power receiving antennas. In the third process step, with the fs/fp value fixed at that point B1, the same test is carried out as in the first process step described above. As a result, the maximum transmission efficiency hmax(P) at the electric power value P can be detected with the fs/fp value fixed at that point B1.

Finally, in the fourth process step, hmax(P) that has just been obtained in the third process step is compared to hmax(P) that was obtained in the first process step, thereby determining which of the two transmission conditions defined at the points A and B1 is preferred to the other.

It should be noted that although only a single electric power value P is used in the first and third process steps to detect hmax(P), multiple electric power values P could also be used as well.

Figure 22:
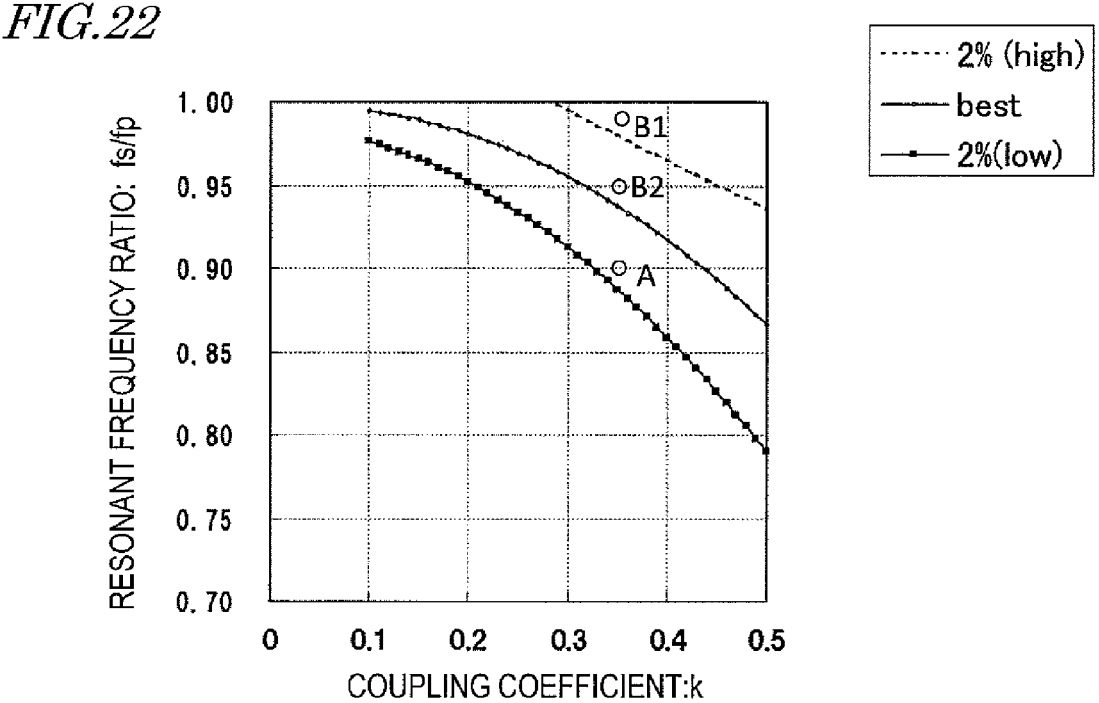
FIG. 22 is a graph showing an exemplary method for optimizing the fs/fp ratio.

As for the two points shown in FIG. 22, the condition defined at the point B1 includes a greater Dip than the condition defined at the point A. That is why the condition defined at the point A may be chosen to make the wireless electric power transmission apparatus operate under the condition defined at the point A. Optionally, the fs/fp value may be further shifted to the point B2 in an extra third process step and then hmax(P) achieved with the fs/fp value at the point B2 may be compared to hmax(P) achieved with the fs/fp value at the point A in an extra fourth process step. In this manner, it can be determined which of the two transmission conditions defined at the points A and B2 is preferred to the other.

By measuring the maximum transmission efficiencies under multiple conditions with mutually different fs/fp values, a more appropriate fs/fp value can be obtained. As for the three points A, B1 and B2 shown in FIG. 22, Dip becomes the smallest when the fs/fp value is located at the point B2. By performing such a variable frequency control on the power transmitting and power receiving antennas in this manner, a high efficiency electric power transmission operation is realized.

In the example described above, the resonant frequency control section 100 is supposed to be connected to the power transmitting antenna 107 or the power receiving antenna 109 as shown in FIGS. 11 and 13. However, this is only an example of the present disclosure. The resonant frequencies of the power transmitting antenna 107 and/or the power receiving antenna 109 do not have to be adjusted using such an electrical signal but may also be adjusted through a mechanical or physical action. For example, in the circuit shown in FIG. 12, the switching circuit SW is turned ON and OFF in response to an electrical signal input. However, the resonant frequency adjustment circuit may also be configured to adjust the resonant frequency using a mechanical device.

Figure 14:
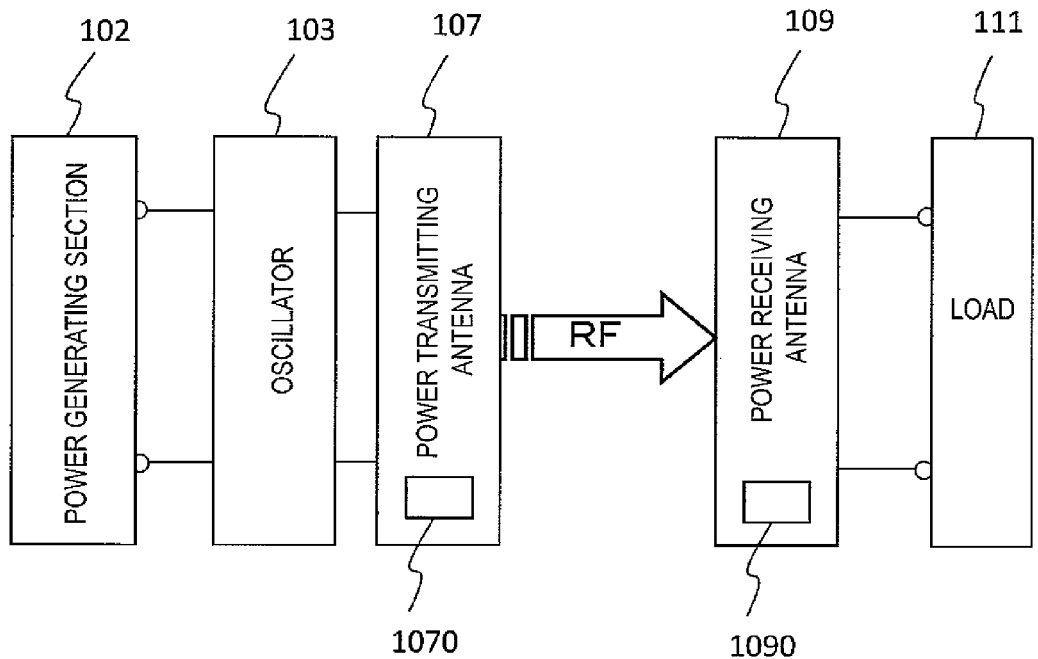
FIG. 14 is a block diagram illustrating an embodiment in which an oscillator 103 is connected to a power generating section 102 and the power receiving antenna 109 is connected to a load 111.

In one embodiment of the present disclosure, the oscillator 103 is connected to a power generating section 102 and the output of the power receiving antenna 109 is connected to a load 111 as shown in FIG. 14. Depending on the status (such as the power dissipation) of the load 111 or the power generating section 102, the magnitude of the electric power to be transmitted from the power transmitting antenna 107 to the power receiving antenna 109 may vary. If the electric power to transmit has varied and if fs/fp=1.0, then the transmission frequency could decrease so much that the Dip rate exceeds 6%. However, according to an embodiment of the present disclosure, the Dip rate can be reduced to 0.1% or less, for example (if k=0.5).

Figure 15:
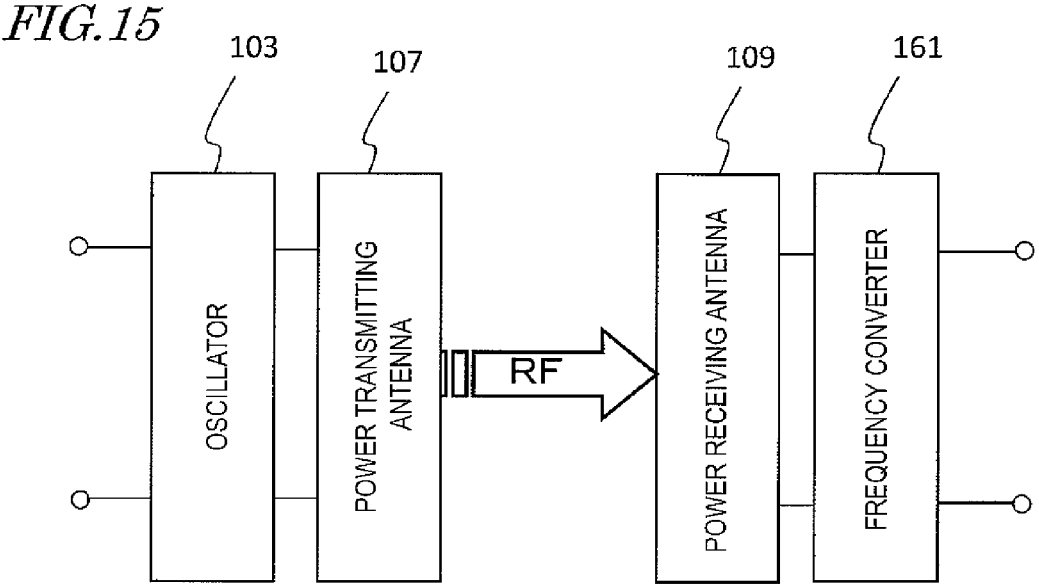
FIG. 15 is a block diagram illustrating an embodiment in which a frequency converter 161 is connected to the output of the power receiving antenna 109.

FIG. 15 illustrates an exemplary configuration in which a frequency converter 161 is connected to the output of the power receiving antenna 109. The frequency converter 161 shown in FIG. 15 receives RF power (electric power) that has been supplied from the power receiving antenna 109 and converts the frequency of the electric power into a value that is required by a load, a power grid or any other electric power outputting block on the last stage. That is why the converted frequency of the electric power may be DC, AC or a radio frequency other than the transmission frequency.

Naturally, a wireless electric power transmission apparatus should maintain high transmission efficiency under such an operating condition that turns the power P to transmit into a maximum one Pmax. However, the efficiency should also be kept high even under such a transmission condition for transmitting a reduced power. Furthermore, no matter whether the power to transmit satisfies P=Pmax or P≠Pmax, a constant voltage operation can be performed. That is why the following relations need to be satisfied between the input and output impedances Zin (P=Pmax), Zout (P=Pmax) when P=Pmax and the input and output impedances Zin and Zout when an arbitrary power P is transmitted:

$$Zin = Zin(P=Pmax) \times (Pmax+P) \quad (9)$$

$$Zout = Zout(P=Pmax) \times (Pmax+P) \quad (10)$$

That is to say, while a constant voltage operation is performed, the input and output impedances change inversely proportionally to the power to transmit. And an object of an embodiment of the present disclosure is to maintain high transmission efficiency in a broad transmission power range. To achieve this object, the resonant frequency ratio fs/fp of the wireless electric power transmission apparatus of the present disclosure is adjusted according to the coupling coefficient k.

It should be noted that such a phenomenon that Dip decreases when the resonant frequency ratio fs/fp is adjusted to a value of less than one according to the coupling coefficient k happens only when the power transmitting and power receiving antennas are implemented as a combination of asymmetric resonant circuit structures such as a series resonant circuit and a parallel resonant circuit. That is to say, the effects of the present disclosure cannot be achieved if the power transmitting and power receiving antennas are implemented as a pair of series resonant circuits or a pair of parallel resonant circuits. Likewise, if the power transmitting and power receiving antennas both have a circuit configuration that is supplied with energy from an external circuit based on the principle of electromagnetic induction (which will be referred to herein as "circuits of electromagnetic induction power supply type"), the effects of the present disclosure cannot be achieved, either. Furthermore, even if the power transmitting and power receiving antennas are implemented as a pair of resonators in a hybrid combination such as a series resonant circuit and an electromagnetic induction power supply type circuit or a parallel resonant circuit and an electromagnetic induction power supply type circuit, the effects of the present disclosure cannot be achieved, either.

It is recommended that while electric power is being transmitted, the coupling coefficient k between the power transmitting and power receiving antennas 107 and 109 be kept substantially constant. This is because if the coupling coefficient k varied significantly while electric power is being transmitted, it would be difficult to achieve the constant-voltage operation with high efficiency.

As the oscillator 103, a class D, E or F amplifier that would realize high efficiency and low distortion may be used. Or a Doherty amplifier could also be used. Optionally, a sinusoidal wave may be produced with high efficiency by arranging a low-pass filter, a band-elimination filter, or a band-pass filter after a switching element (such as an inverter circuit) that generates an output signal with a distortion component. In that case, the wireless transmission section may also function as a band-pass filter. The oscillator 103 may even be a frequency converter that receives an AC input and delivers an output with a high frequency. In any case, the power that has been supplied to the oscillator is converted into RF energy. That RF energy is transmitted wirelessly through the space by the wireless transmission section and then output through the output terminal.

To reduce multiple reflection of the RF power between the circuit blocks and to improve the overall transmission efficiency, when the output terminal of the power receiving antenna 109 is connected to a load, the output impedance Zoc of the RF power of the oscillator 103 is suitably matched to the input impedance Zic of the power transmitting antenna 107. Likewise, when the oscillator 103 is connected to the power transmitting antenna 107, the output impedance Zout of the power receiving antenna is suitably matched to the resistance value R of the connected load. In this description, if two impedances are "equal to each other", then the impedances may naturally be exactly equal to each other but could also be just roughly equal to each other. Specifically, if the difference between the greater and smaller impedances is within 25% of the greater one, then those two impedances will also be regarded herein as being "equal to each other".

According to this embodiment, the efficiency of the wireless electric power transmission depends on the gap between the power transmitting and power receiving antennas 107 and 109 (which will be referred to herein as an "antenna-to-antenna gap") and on the magnitude of loss caused by circuit components that form the power transmitting and power receiving antennas 107 and 109. In this description, the "antenna-to-antenna gap" substantially means the gap between the two inductors 107a and 109a. The antenna-to-antenna gap can be estimated based on the feature size of the areas occupied by those antennas.

Figure 16:
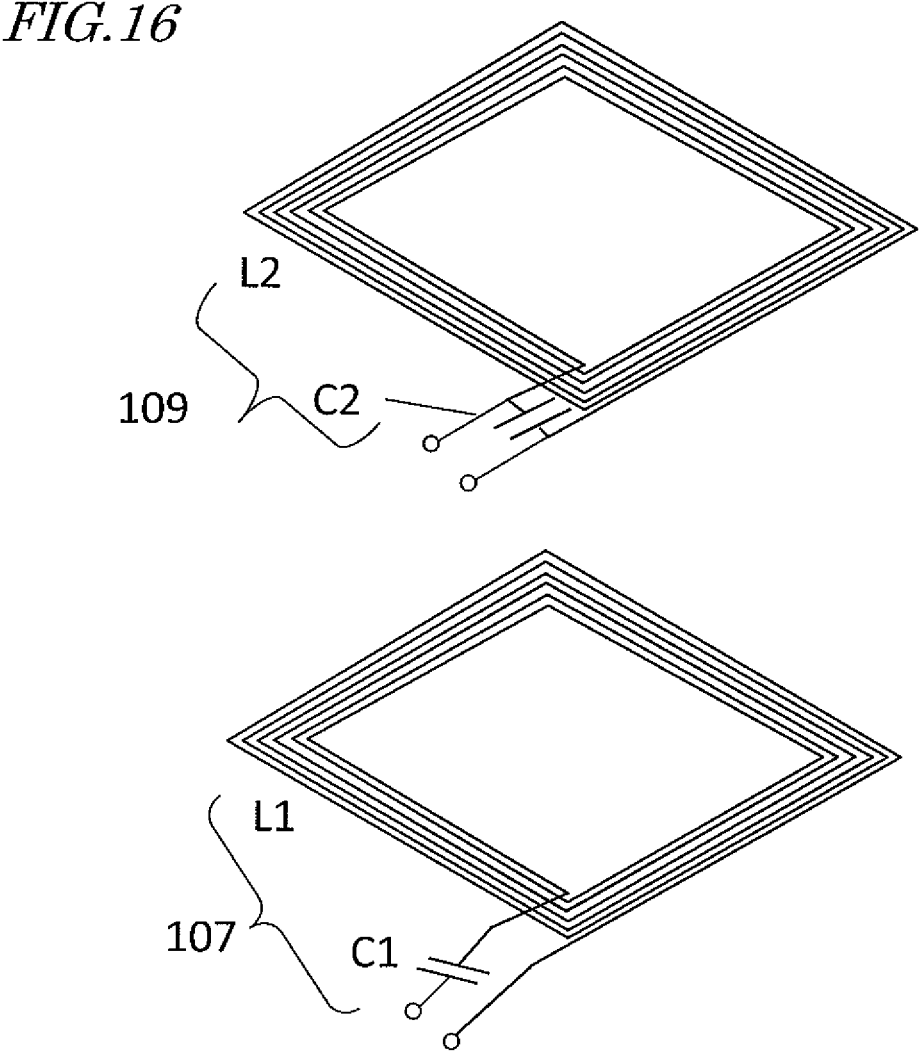
FIG. 16 is a perspective view illustrating exemplary configurations for a power transmitting antenna and a power receiving antenna.

In one embodiment, the first and second inductors 107a and 109a both have the same planar pattern as can be seen from the schematic perspective view shown in FIG. 16. The planar patterns of these inductors may be selected arbitrarily. That is to say, the inductors do not always have to be square or circular ones but may also be rectangular or elliptical ones as well. In this description, the "feature size" of the areas occupied by the antennas refers to an inductor size of the smallest one of the antennas. Specifically, if the inductor of an antenna has a circular planar pattern, then the feature size is defined to be the diameter of the inductor. On the other hand, if the inductor has a square planar pattern, the feature size is defined to be the length of each side thereof. And if the inductor has a rectangular planar pattern, the feature size is defined to be the length of its shorter sides.

In this embodiment, the first and second inductors 107a and 109a have a spiral structure, of which the numbers of turns are N1 and N2, respectively, where N1>1 and N2>1. However, the first and second inductors 107a and 109a may also have a loop structure with a number of turns of one. These inductors 107a and 109a do not have to be made of a single-layer conductor pattern but may also be a series connection of multiple conductor patterns that have been stacked one upon the other.

The first and second inductors 107a and 109a are suitably made of copper, silver or any other conductor with good electrical conductivity. As RF current with RF power flows mostly around the surface of a conductor, the surface of the conductor may be covered with a material with high electrical conductivity to increase the power generation efficiency. If the inductors 107a and 109a are designed so as to have a cavity in the middle of its cross section, their weight can be reduced. Furthermore, if the inductors 107a and 109a are formed by adopting a parallel wiring structure with Litz wires, for example, then the conductor loss per unit length can be reduced and the Q factors of the series resonant circuit and the parallel resonant circuit can be increased. As a result, electric power can be transmitted with even higher efficiency.

To cut down the manufacturing cost, the wiring may be formed at a time by ink printing technique. If necessary, a magnetic body may be arranged near the first and/or second inductor(s) 107a, 109a. Inductors with an air-core spiral structure, which can set the coupling coefficient between the inductors 107a and 109a to be a moderate value, can be used.

As the first and second capacitors 107b and 109b, any type of capacitors, which may have a chip shape, a lead shape or any other appropriate shape, may be used. Optionally, the capacitance produced between two levels of wires that interpose the air between them could also function as the first and second capacitors 107b and 109b. If the first and second capacitors 107b and 109b are implemented as MIM capacitors, a low-loss capacitor circuit can be formed by known semiconductor device processing or multilevel circuit board process.

Although it depends on the transmission efficiency of antenna-to-antenna electric power transmission as required by the system and the value of the coupling coefficient k, the Q factors of the resonators that are used as the power transmitting and power receiving antennas 107 and 109 should be at least 100, and are suitably set to be 200 or more, more suitably 500 or more, and even more suitably 1000 or more. To achieve such high Q factors, it is effective to adopt Litz wires as described above.

EXAMPLES

Hereinafter, specific examples of the present disclosure and comparative examples will be described.

A difference between the specific examples of the present disclosure and the comparative examples lies in the fs/fp ratio. Specifically, the fs/fp ratio is equal to 1.0 in the comparative examples, but the fs/fp ratio is calculated by substituting a specific value of 0.1 to 0.5 for the coupling coefficient k in Equation (2).

Figure 21A:
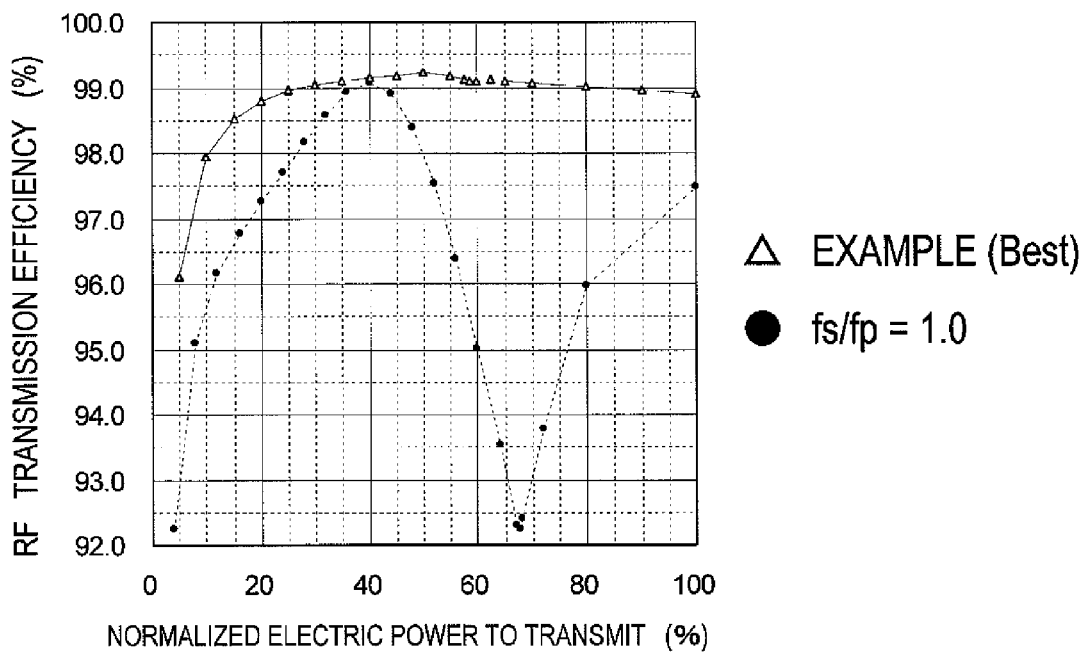
FIG. 21A is a graph showing how the transmission efficiency changes with the electric power to transmit when k=0.5.
Figure 21B:
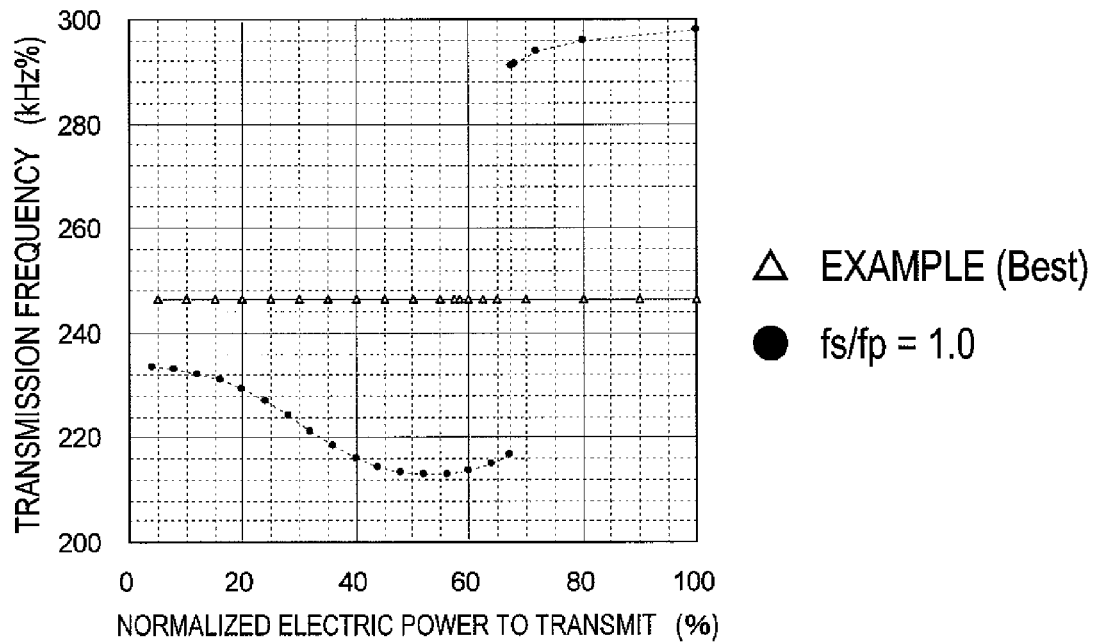
FIG. 21B is a graph showing how the transmission frequency changes with the electric power to transmit when k=0.5.

FIGS. 17A, 18A, 19A, 20A and 21A are graphs showing how the transmission efficiency changes with the electric power to transmit when k=0.1, when k=0.2, when k=0.3, when k=0.4 and when k=0.5, respectively. On the other hand, FIGS. 17B, 18B, 19B, 20B and 21B are graphs showing how the resonant frequency changes with the electric power to transmit when k=0.1, when k=0.2, when k=0.3, when k=0.4 and when k=0.5, respectively. FIGS. 17A and 17B show the results that were obtained in Example 1 and Comparative Example 1. FIGS. 18A and 18B show the results that were obtained in Example 2 and Comparative Example 2. FIGS. 19A and 19B show the results that were obtained in Example 3 and Comparative Example 3. FIGS. 20A and 20B show the results that were obtained in Example 4 and Comparative Example 4. And FIGS. 21A and 21B show the results that were obtained in Example 5 and Comparative Example 5. The curves shown in these drawings were obtained by computer simulations. The following are the parameters on which those calculations were carried out:

Example 1

In a situation where the coupling coefficient is 0.1,
transmission frequency: 252.2 kHz,
power transmitting antenna's inductance: 41.21 uH,
power transmitting antenna's capacitance: 9.72 nF,
power transmitting antenna's resonant frequency fs: 251.4 kHz,
power receiving antenna's inductance: 41 uH,
power receiving antenna's capacitance: 9.68 nF, and
power receiving antenna's resonant frequency fp: 252.7kHz.

Comparative Example 1A transmission frequency: set to be a frequency that falls within the range of 249.9 to 254.5 kHz and that will maximize the efficiency,
power transmitting antenna's inductance: 41.08 uH,
power transmitting antenna's capacitance: 9.69 nF,
power transmitting antenna's resonant frequency fs: 252.2 kHz,
power receiving antenna's inductance: 41.08 uH,
power receiving antenna's capacitance: 9.69 nF, and
power receiving antenna's resonant frequency fp: 252.2 kHz.

Each of the inductors of the antennas with such inductances may be a Litz wire that has been formed by arranging multiple sets of 300 copper wires, each having a diameter of 80 μm, in parallel with each other so that those sets are electrically insulated from each other. The two inductors may both have a circular shape with a diameter of 12 cm and their number of turns may be 20. The inductance values of Example 1 and Comparative Example 1 can be controlled by adjusting the width of the gap between the wires and the inside diameter of the inductor. The same can be said about the examples to be described below. The capacitor may be implemented as a stacked ceramic capacitor. In this case, the circuit on the transmitting end is implemented as a series resonant circuit, while the circuit on the receiving end is implemented as a parallel resonant circuit. The power transmitting and power receiving antennas are arranged so that their front sides face each other and are parallel to each other with a gap g of 5.5 cm left between them. Then, a coupling coefficient of 0.1 may be realized.

Example 2

In a situation where the coupling coefficient is 0.2,
transmission frequency: 250 kHz,
power transmitting antenna's inductance: 42.18 uH,
power transmitting antenna's capacitance: 9.95 nF,
power transmitting antenna's resonant frequency fs: 245.6 kHz,
power receiving antenna's inductance: 42.75 uH,
power receiving antenna's capacitance: 9.43 nF, and
power receiving antenna's resonant frequency fp: 250.7 kHz.

Comparative Example 2A transmission frequency: set to be a frequency that falls within the range of 241.3 to 259 kHz and that will maximize the efficiency,
power transmitting antenna's inductance: 41.08 uH,
power transmitting antenna's capacitance: 9.69 nF,
power transmitting antenna's resonant frequency fs: 252.2 kHz,
power receiving antenna's inductance: 41.08 uH,
power receiving antenna's capacitance: 9.69 nF, and power receiving antenna's resonant frequency fp: 252.2 kHz.

The power transmitting and power receiving antennas are arranged so that their front sides face each other and are parallel to each other with a gap g of 4 cm left between them. Then, a coupling coefficient of 0.2 may be realized.

Example 3

In a situation where the coupling coefficient is 0.3,
transmission frequency: 255.8 kHz,
power transmitting antenna's inductance: 42.36 uH,
power transmitting antenna's capacitance: 10.00 nF,
power transmitting antenna's resonant frequency fs: 244.6 kHz,
power receiving antenna's inductance: 40.41 uH,
power receiving antenna's capacitance: 9.53 nF, and
power receiving antenna's resonant frequency fp: 256.4 kHz.

Comparative Example 3A transmission frequency: set to be a frequency that falls within the range of 240.3 to 276.2 kHz and that will maximize the efficiency,
power transmitting antenna's inductance: 41.08 uH,
power transmitting antenna's capacitance: 9.69 nF,
power transmitting antenna's resonant frequency fs: 252.2 kHz,
power receiving antenna's inductance: 41.08 uH,
power receiving antenna's capacitance: 9.69 nF, and
power receiving antenna's resonant frequency fp: 252.2 kHz.

The power transmitting and power receiving antennas are arranged so that their front sides face each other and are parallel to each other with a gap g of 2.9 cm left between them. Then, a coupling coefficient of 0.3 may be realized.

Example 4

In a situation where the coupling coefficient is 0.4,
transmission frequency: 274.6 kHz,
power transmitting antenna's inductance: 41.05 uH,
power transmitting antenna's capacitance: 9.69 nF,
power transmitting antenna's resonant frequency fs: 252.4 kHz,
power receiving antenna's inductance: 37.62 uH,
power receiving antenna's capacitance: 8.88 nF, and
power receiving antenna's resonant frequency fp: 275.4 kHz.

Comparative Example 4A transmission frequency: set to be a frequency that falls within the range of 234.6 to 294.4 kHz and that will maximize the efficiency,
power transmitting antenna's inductance: 41.08 uH,
power transmitting antenna's capacitance: 9.69 nF,
power transmitting antenna's resonant frequency fs: 252.2 kHz,
power receiving antenna's inductance: 41.08 uH,
power receiving antenna's capacitance: 9.69 nF, and power receiving antenna's resonant frequency fp: 252.2 kHz.

The power transmitting and power receiving antennas are arranged so that their front sides face each other and are parallel to each other with a gap g of 1.9 cm left between them. Then, a coupling coefficient of 0.4 may be realized.

Example 5

In a situation where the coupling coefficient is 0.5,
transmission frequency: 246.3 kHz,
power transmitting antenna's inductance: 41.05 uH,
power transmitting antenna's capacitance: 13.11 nF,
power transmitting antenna's resonant frequency fs: 216.9 kHz,
power receiving antenna's inductance: 37.62 uH,
power receiving antenna's capacitance: 11.02 nF, and
power receiving antenna's resonant frequency fp: 247.2 kHz.

Comparative Example 5A transmission frequency: set to be a frequency that falls within the range of 212.8 to 298 kHz and that will maximize the efficiency,
power transmitting antenna's inductance: 41.08 uH,
power transmitting antenna's capacitance: 9.69 nF,
power transmitting antenna's resonant frequency fs: 252.2 kHz,
power receiving antenna's inductance: 41.08 uH,
power receiving antenna's capacitance: 9.69 nF, and
power receiving antenna's resonant frequency fp: 252.2 kHz.

The power transmitting and power receiving antennas are arranged so that their front sides face each other and are parallel to each other with a gap g of 4 cm left between them. Then, a coupling coefficient of 0.5 may be realized.

As can be seen easily by comparing the results of the specific examples of the present disclosure to those of the comparative examples, even if the transmission frequency is kept constant, electric power can be transmitted wirelessly with higher efficiencies in the specific examples of the present disclosure than in the comparative examples.

The wireless electric power transmission apparatus of the present disclosure can be used as a power supplying system for supplying power to various devices (including a TV set and other audiovisual devices and washers, refrigerators, air conditioners and other household electronic appliances).

In addition, the wireless electric power transmission apparatus of the present disclosure is also applicable as a charging system for various electronic devices, electric motorcycles, electric bicycles, and electric cars that use a rechargeable battery. This is because a rechargeable battery such as a lithium battery sometimes needs to have its charge operation controlled at a constant voltage. Furthermore, the system of the present disclosure is also applicable for use in any electronic device with a motor to be driven at a constant voltage.

Moreover, the wireless electric power transmission apparatus of the present disclosure is also applicable to a system that collects the electric power that has been generated by a solar power generation system.

While the exemplary embodiments of the invention has been described, it will be apparent to those skilled in the art that the disclosed exemplary embodiments may be modified in numerous ways and may assume many embodiments other than those specifically described above. Accordingly, it is intended by the appended claims to cover all modifications of the exemplary embodiments that fall within the true spirit and scope of the invention.

What is claimed is:

1. A wireless electric power transmission apparatus comprising:
   two antennas having the ability to transmit electric power by a non-contact method via resonant magnetic coupling, one of the two antennas being a series resonant circuit, of which the resonant frequency is fs, the other antenna being a parallel resonant circuit, of which the resonant frequency is fp; and
   an oscillator which is connected to one of the two antennas that transmits RF power,
   wherein if the coupling coefficient between the two antennas is k, then fs and fp are set so as to satisfy the inequality $-1.1516 \times k^2 + 0.0363 \times k + 0.9983 \leq fs/fp < 1$.

2. The wireless electric power transmission apparatus of claim 1, wherein if $0.1 \leq k < 0.27$, then $-1.1516 \times k^2 + 0.0363 \times k + 0.9983 \leq fs/fp < 1$ is satisfied,
   if $0.27 \leq k < 0.32$, then $-1.1516 \times k^2 + 0.0363 \times k + 0.9983 \leq fs/fp < -0.0979 \times k^2 - 0.1347 \times k + 1.044$ is satisfied, and
   if $0.32 \leq k \leq 0.5$, then $-0.7074 \times k^2 - 0.0724 \times k + 0.9876 \leq fs/fp < -0.0979 \times k^2 - 0.1347 \times k + 1.044$ is satisfied.

3. The wireless electric power transmission apparatus of claim 1, wherein if $0.1 \leq k < 0.26$, then $-1.1516 \times k^2 + 0.0363 \times k + 0.9983 \leq fs/fp < 1$ is satisfied,
   if $0.26 \leq k < 0.29$, then $-0.7309 \times k^2 - 0.0269 \times k + 0.9862 \leq fs/fp < 1$ is satisfied, and
   if $0.29 \leq k < 0.5$, then $-0.7309 \times k^2 - 0.0269 \times k + 0.9862 \leq fs/fp < 0.08 \times k^2 - 0.357 \times k + 1.0944$ is satisfied.

4. The wireless electric power transmission apparatus of claim 1, wherein if $0.1 \leq k < 0.19$, then $-1.1516 \times k^2 + 0.0363 \times k + 0.9983 \leq fs/fp < 1$ is satisfied,
   if $0.19 \leq k < 0.21$, then $-0.7348 \times k^2 + 0.087 \times k + 0.9889 \leq fs/fp < 1$ is satisfied, and
   if $0.21 \leq k < 0.5$, then $-0.7348 \times k^2 + 0.087 \times k + 0.9889 \leq fs/fp < -0.5377 \times k^2 + 0.10018 \times k + 1.00106$ is satisfied.

5. The wireless electric power transmission apparatus of claim 1, wherein if $0.1-k<0.15$, then $-1.1516 \times k^2 + 0.0363 \times k + 0.9983 \leq fs/fp < 1$ is satisfied, and
   if $0.15 \leq k < 0.5$, then $-0.7242 \times k^2 + 0.0329 \times k + 0.9894 \leq fs/fp < -0.5183 \times k^2 + 0.0603 \times k + 1.0016$ is satisfied.

6. The wireless electric power transmission apparatus of claim 1, wherein fs and fp are set so as to satisfy the equation $fs/fp = -0.6074 \times k^2 + 0.0466 \times k + 0.9955$.

7. The wireless electric power transmission apparatus of claim 1, further comprising a resonant frequency adjustment circuit which changes at least one of fs and fp.

8. The wireless electric power transmission apparatus of claim 7, further comprising a controller which controls the resonant frequency adjustment circuit and which changes at least one of fs and fp according to the value of the coupling coefficient k.

9. The wireless electric power transmission apparatus of claim 1, wherein even if power to transmit changes, the frequency of the RF power is kept constant.

10. The wireless electric power transmission apparatus of claim 7, further comprising a controller which controls the resonant frequency adjustment circuit and which changes at least one of fs and fp, and
    wherein after the wireless electric power transmission apparatus has been installed, the controller transmits electric power wirelessly with fs/fp set to be multiple different values, measures transmission efficiency, and then determines an fs/fp value for a normal operation based on the transmission efficiency.

11. A power transmitting device for use in the wireless electric power transmission apparatus of claim 1, comprising:
    one of the two antennas configured to transmit RF power; and
    an oscillator that is connected to the antenna.

12. A power receiving device for use in the wireless electric power transmission apparatus of claim 1, comprising one of the two antennas configured to receive RF power.

13. A controller for use in the wireless electric power transmission apparatus of claim 7, configured to control the resonant frequency adjustment circuit and change at least one of fs and fp according to the value of the coupling coefficient k.

* * * * *